United States Patent
Segawa et al.

(10) Patent No.: US 10,315,517 B2
(45) Date of Patent: Jun. 11, 2019

(54) VEHICLE DISPLAY DEVICE FOR DISPLAYING INFORMATION USED FOR VEHICLE DRIVING

(71) Applicant: JVC KENWOOD Corporation, Yokohama-shi, Kanagawa-ku (JP)

(72) Inventors: Masaru Segawa, Yokohama (JP); Kiyofumi Tabata, Yokohama (JP); Tatsuo Oi, Yokohama (JP); Akimitsu Ochiai, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 126 days.

(21) Appl. No.: 15/654,302

(22) Filed: Jul. 19, 2017

(65) Prior Publication Data
US 2017/0313192 A1 Nov. 2, 2017

Related U.S. Application Data

(63) Continuation of application No. PCT/JP2016/054699, filed on Feb. 18, 2016.

(30) Foreign Application Priority Data

Feb. 20, 2015 (JP) .................................. 2015-031382
Feb. 20, 2015 (JP) .................................. 2015-031383
(Continued)

(51) Int. Cl.
*B60K 37/02* (2006.01)
*B60K 35/00* (2006.01)
(Continued)

(52) U.S. Cl.
CPC .............. *B60K 37/02* (2013.01); *B60K 35/00* (2013.01); *B60K 37/06* (2013.01); *B60R 11/02* (2013.01);
(Continued)

(58) Field of Classification Search
CPC ...................................................... B60K 37/02
See application file for complete search history.

(56) References Cited

U.S. PATENT DOCUMENTS 6,119,060 A * 9/2000 Takayama .............. B60K 35/00
  307/9.1
6,731,436 B2 * 5/2004 Ishii ....................... G02B 27/01
  348/115
(Continued)

FOREIGN PATENT DOCUMENTS

CN 105474287 A 4/2016
JP 2001-018715 A 1/2001
(Continued)

*Primary Examiner* — Alex C Dunn
(74) *Attorney, Agent, or Firm* — Brundidge & Stanger, P.C.

(57) ABSTRACT

A first display panel and a second display panel display information used for vehicle driving. An information acquisition unit acquires a condition of the vehicle. A switching unit switches from a first display mode of the first display panel and the second display panel to a second display mode of the first display panel and the second display panel for displaying information of a smaller information volume than an information volume of information displayed in the first display mode, based on the condition of the vehicle acquired in the information acquisition unit.

16 Claims, 19 Drawing Sheets

(30) Foreign Application Priority Data

| | | |
|---|---|---|
| Feb. 20, 2015 | (JP) | ................................ 2015-031384 |
| Feb. 20, 2015 | (JP) | ................................ 2015-031385 |
| Oct. 9, 2015 | (JP) | ................................ 2015-200758 |

(51) Int. Cl.
   *B60R 11/02*   (2006.01)
   *G06F 3/14*    (2006.01)
   *B60K 37/06*   (2006.01)
   *B60R 11/00*   (2006.01)

(52) U.S. Cl.
   CPC .... *G06F 3/1423* (2013.01); *B60K 2350/1028* (2013.01); *B60K 2350/1068* (2013.01); *B60K 2350/1096* (2013.01); *B60K 2350/906* (2013.01); *B60R 2011/0007* (2013.01); *G09G 2380/10* (2013.01)

(56) References Cited

U.S. PATENT DOCUMENTS

| | | | | |
|---|---|---|---|---|
| 7,366,325 | B2* | 4/2008 | Fujimura | G06K 9/00369 |
| | | | | 382/104 |
| 7,433,496 | B2* | 10/2008 | Ishii | G06T 5/009 |
| | | | | 348/115 |
| 7,952,808 | B2* | 5/2011 | Hotta | G02B 27/01 |
| | | | | 340/425.5 |
| 8,412,413 | B1* | 4/2013 | Stark | G02B 27/01 |
| | | | | 340/980 |
| 10,176,557 | B2* | 1/2019 | Jiang | G06T 5/002 |
| 2003/0128436 | A1* | 7/2003 | Ishii | G02B 27/01 |
| | | | | 359/630 |
| 2006/0103590 | A1* | 5/2006 | Divon | G02B 27/01 |
| | | | | 345/7 |
| 2006/0164230 | A1* | 7/2006 | DeWind | B60K 35/00 |
| | | | | 340/461 |
| 2006/0278155 | A1* | 12/2006 | Soltendieck | B60K 37/02 |
| | | | | 116/62.4 |
| 2008/0125944 | A1* | 5/2008 | Kamishima | B60W 10/06 |
| | | | | 701/54 |
| 2010/0058242 | A1* | 3/2010 | Kimoto | B60K 35/00 |
| | | | | 715/830 |
| 2011/0007084 | A1* | 1/2011 | Park | G06F 3/1423 |
| | | | | 345/549 |
| 2011/0035099 | A1* | 2/2011 | Kobayashi | B60K 35/00 |
| | | | | 701/36 |
| 2011/0261051 | A1* | 10/2011 | Meyer | B60K 35/00 |
| | | | | 345/419 |
| 2012/0133770 | A1* | 5/2012 | Joao | G01C 21/3691 |
| | | | | 348/149 |
| 2013/0314253 | A1* | 11/2013 | Mizuguchi | G08G 1/161 |
| | | | | 340/905 |
| 2014/0053590 | A1* | 2/2014 | Madhavan | B60H 1/00764 |
| | | | | 62/244 |
| 2014/0362347 | A1* | 12/2014 | Oel | G03B 21/608 |
| | | | | 353/13 |
| 2015/0063648 | A1* | 3/2015 | Minemura | G06K 9/6217 |
| | | | | 382/104 |
| 2015/0125031 | A1* | 5/2015 | Hayakawa | G08G 1/166 |
| | | | | 382/103 |
| 2016/0207399 | A1* | 7/2016 | Ogasawara | B60K 35/00 |
| 2016/0207456 | A1* | 7/2016 | Hisada | B60Q 9/00 |
| 2017/0083216 | A1* | 3/2017 | Wild | B60K 37/06 |

FOREIGN PATENT DOCUMENTS

| | | |
|---|---|---|
| JP | 2003-200755 A | 7/2003 |
| JP | 2012-154749 A | 8/2012 |
| JP | 2012-194060 A | 10/2012 |
| JP | 2014091440 A | 5/2014 |

\* cited by examiner

VEHICLE DISPLAY DEVICE FOR DISPLAYING INFORMATION USED FOR VEHICLE DRIVING

CROSS-REFERENCE TO RELATED APPLICATION

This application is based upon and claims the benefit of priority from the prior Japanese Patent Application No. 2015-031382, filed on Feb. 20, 2015, Japanese Patent Application No. 2015-031383, filed on Feb. 20, 2015, Japanese Patent Application No. 2015-031384, filed on Feb. 20, 2015, Japanese Patent Application No. 2015-031385, filed on Feb. 20, 2015, and Japanese Patent Application No. 2015-200758, filed on Oct. 9, 2015, the entire contents of which are incorporated herein by reference.

BACKGROUND

1. Field

The present invention relates to a display technology for vehicles and, in particular, to a vehicle display device for displaying information used to vehicle driving.

2. Description of the Related Art

Conventionally, mechanically-based indicators are used for display on instrument panels used in vehicles such as automobiles. Recently, instrument panels are being replaced by display devices using liquid crystal panels, etc. to enable the display content and display mode to be optionally changed. For example, the display mode is changed depending on the traveling speed (see, for example, patent document 1).

[patent document 1] JP2012-154749

In instrument panels using display panels, a variety of information can be displayed and display modes of a variety of designs can be implemented. Accordingly, the area of the display surface tends to be large. Depending on the condition of the vehicle, however, it is necessary to display highly important information or information required at all times in a manner properly visible to the driver. It would also be necessary to reduce heat dissipation from the display panel or reduce reflection of ambient light depending on the vehicle condition.

SUMMARY

To address the above issue, a vehicle display device according to an embodiment comprises: a display panel that displays information used for vehicle driving; an information acquisition unit that acquires a condition of the vehicle; and a switching unit that switches from a first display mode of the display panel to a second display mode of the display panel for displaying information of a smaller information volume than an information volume of information displayed in the first display mode by configuring a visible area to be smaller than that of the first display mode, based on the condition of the vehicle acquired in the information acquisition unit.

Another embodiment also relates to a vehicle display device. The device comprises: a display panel; a switching unit that switches display modes of the display panel; and a control unit that, in one of the display modes implemented by switching in the switching unit, presents information by displaying the information on a portion in the display panel where display content is visible to a user and presents information by lighting or not lighting a portion in the display panel where display content is not visible to the user because the portion is not exposed.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

Embodiment 1

A brief summary will be given before describing the invention in specific details. Embodiment 1 relates to a vehicle display device for displaying information as an instrument panel of a vehicle. The vehicle display device is provided with two types of display panels that differ in the area of display surface. A display panel with a larger area (hereinafter, referred to as "a first display panel") displays information ordinarily shown on an instrument panel. A display panel with a smaller area (hereinafter, referred to as "a second display panel") displays information of a smaller information volume than the information volume of the information displayed on the first display panel.

The vehicle display device orients one of the first and second display panels toward the driver depending on the condition in the neighborhood of the vehicle, etc. and displays information on the display panel thus oriented.

Figure 1:
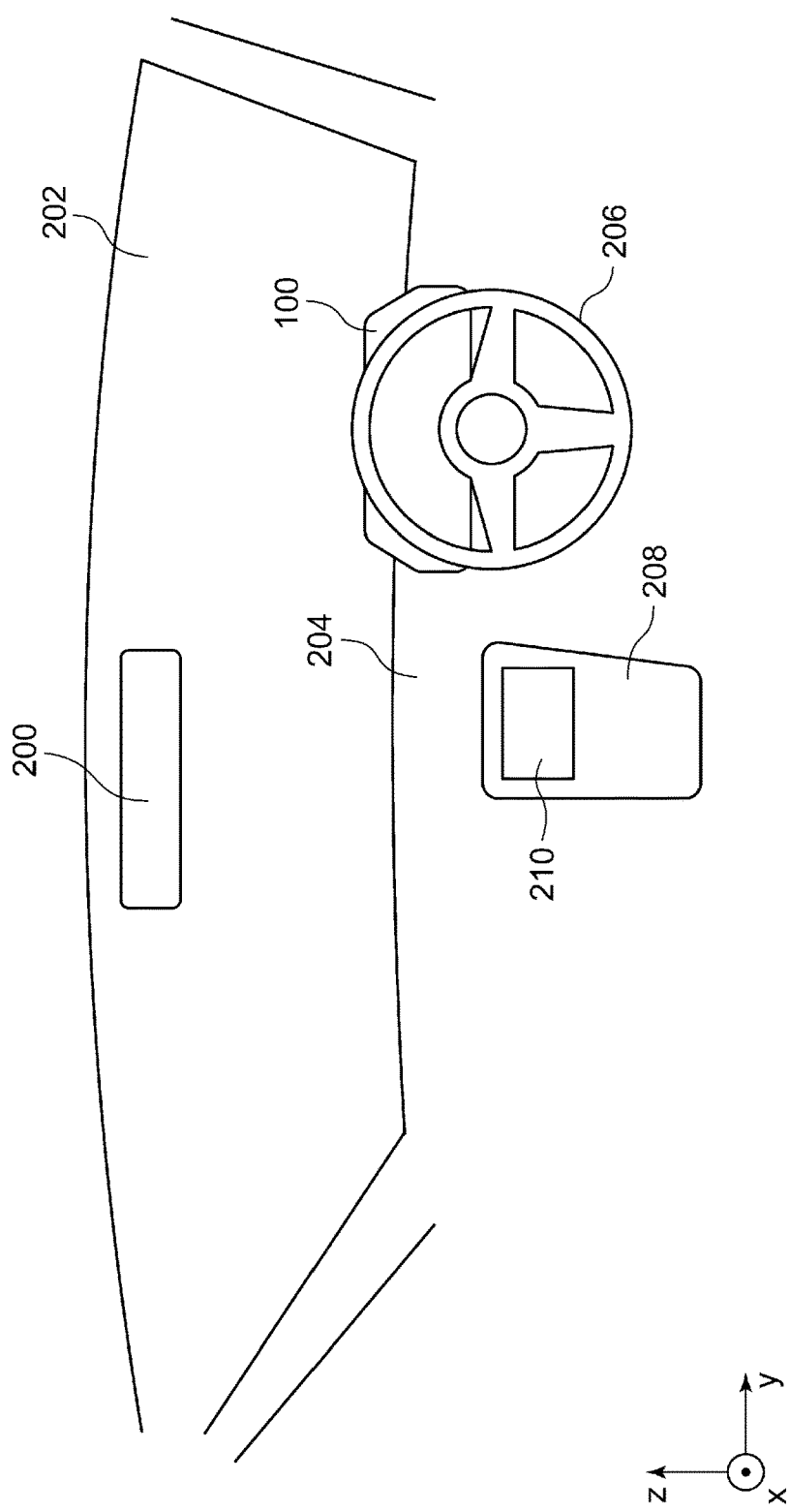
FIG. 1 is a view, from behind, showing the appearance of the interior of the vehicle in which a vehicle display device according to Embodiment 1 is installed.

FIG. 1 is a view, from behind, showing the appearance of the interior of the vehicle in which a vehicle display device 100 according to Embodiment 1 is installed. As shown in FIG. 1, a rectangular coordinate system formed by an x axis, y axis, and z axis is defined. The x axis extends in the direction of length of the vehicle, the y axis extends in the direction of width of the vehicle, and the z axis extends in the direction of height of the vehicle. The positive directions of the x axis, y axis, and z axis are defined as the directions of arrows in FIG. 1, and the negative directions are defined as the directions opposite to the directions of the arrows. The positive direction of the x axis is the direction away from a steering wheel 206 and toward the driver's seat in FIG. 1 and will also be referred to as "front side." The negative direction of the x axis is the direction away from the steering wheel 206 toward the windshield 202 in FIG. 1 and will also be referred to as "rear side." The positive direction of the z axis may be referred to as "toward the top" and the negative direction of the z axis may be referred to as "toward the bottom."

The description of the embodiments uses an example of a vehicle where the steering wheel 206 is provided on the right side of the vehicle. Thus, the steering wheel 206 is located anteriorly in the vehicle and on the positive side of the y axis. Therefore, the driver's seat (not shown) is also located on the positive side of the y axis and the front passenger seat is located on the negative side of the y axis. Alternatively, the steering wheel 206 and the driver's seat may be located on the negative side of the y axis. The vehicle display device 100 is located on the negative side of steering wheel 206 in the direction of the x axis, and the vehicle display device 100 is attached to a dashboard 204. The vehicle display device 100 has the function of an instrument panel.

The windshield 202 is located on the negative side of the dashboard 204 along the x axis, and a rear view mirror 200 is located on the positive side of the windshield 202 along the z axis. Further, a navigation screen 210 is located on the negative side of the steering wheel 206 along the y axis. For example, the navigation screen 210 is located in a center console 208. The navigation screen 210 is a screen of a navigation terminal device for a vehicle and displays images of a car navigation system, for example.

Figure 2:
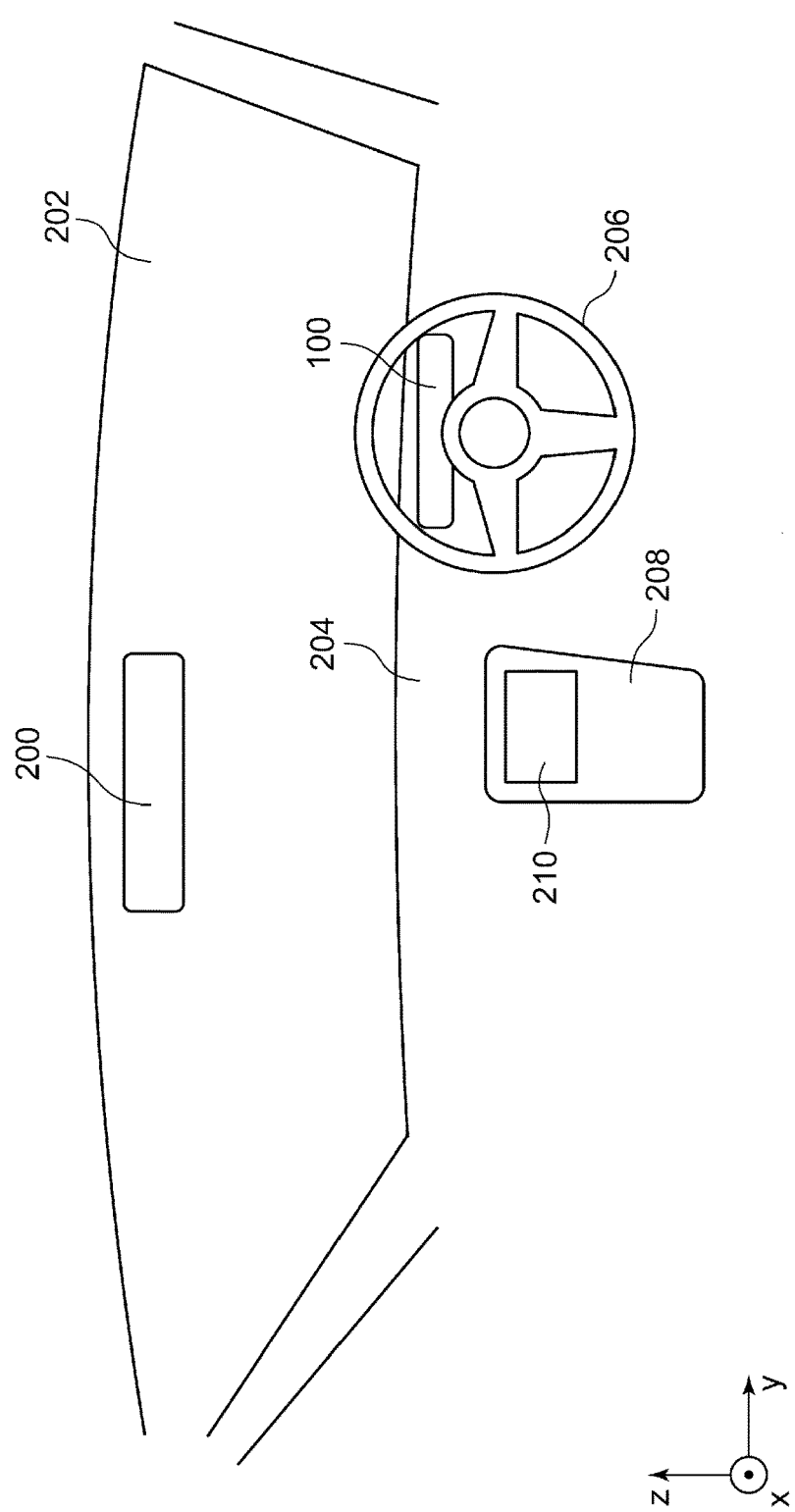
FIG. 2 is an alternative view, from behind, showing the appearance of the interior of the vehicle in which the vehicle display device of FIG. 1 is installed.

FIG. 2 is an alternative view, from behind, showing the appearance of the interior of the vehicle in which the vehicle display device 100 is installed. FIG. 2 shows the same features as FIG. 1 except that the shape of the vehicle display device 100 differs from that of FIG. 1. The shapes of the vehicle display device 100 in FIGS. 1 and 2 will be discussed below. The shape of the vehicle display device 100 in a view of the vehicle interior from behind is changed as shown in FIGS. 1 and 2.

Figure 3:
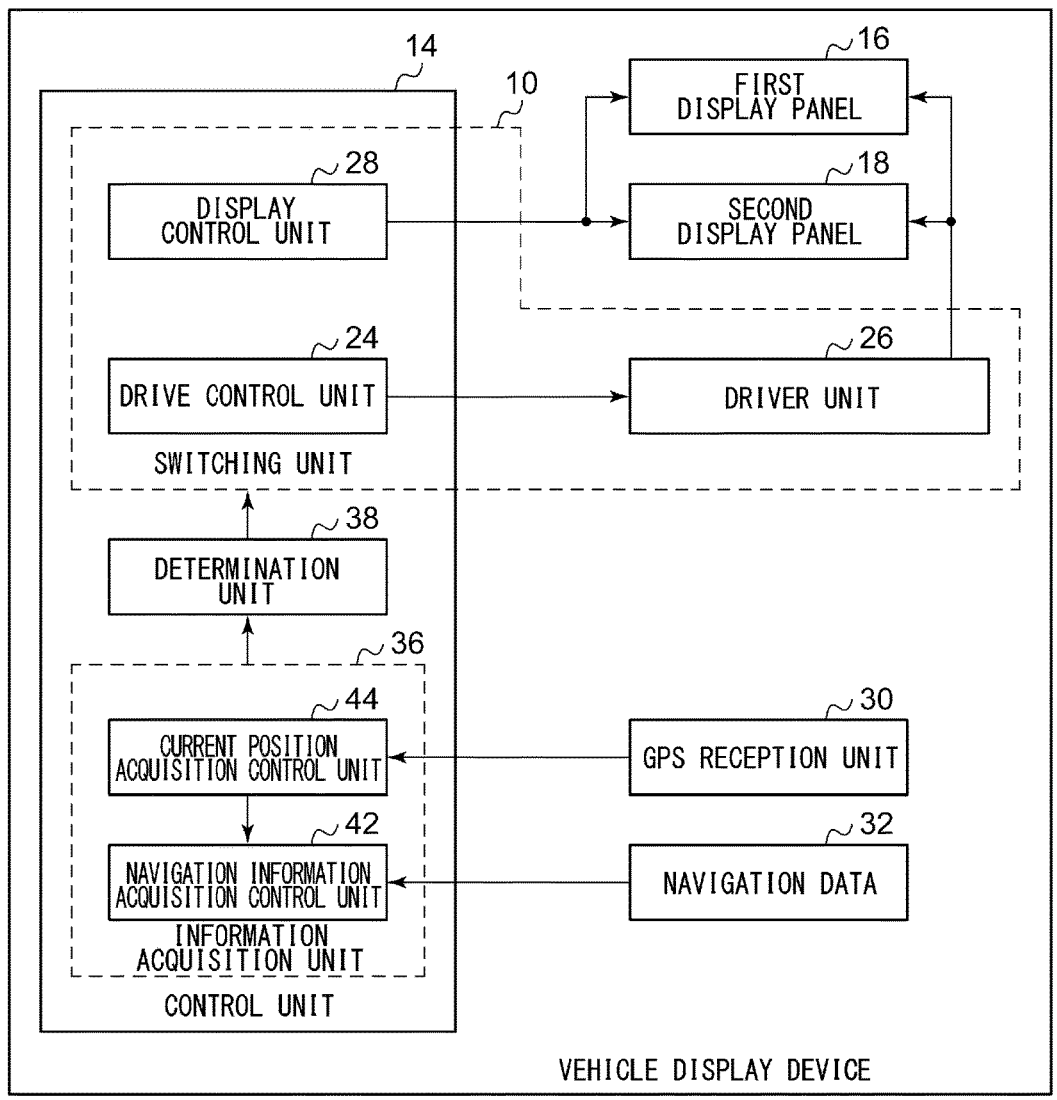
FIG. 3 shows features of the vehicle display device of FIG. 1.

FIG. 3 shows features of the vehicle display device 100. The vehicle display device 100 includes a switching unit 10, a first display panel 16, a second display panel 18, a GPS reception unit 30, navigation data 32, an information acquisition unit 36, a determination unit 38. The switching unit 10 includes a drive control unit 24, a drive unit 26, a display control unit 28. The information acquisition unit 36 includes a navigation information acquisition control unit 42 and a current position acquisition control unit 44. The control unit 14 includes a drive control unit 24, a display control unit 28, an information acquisition unit 36, and a determination unit 38.

Figure 4:
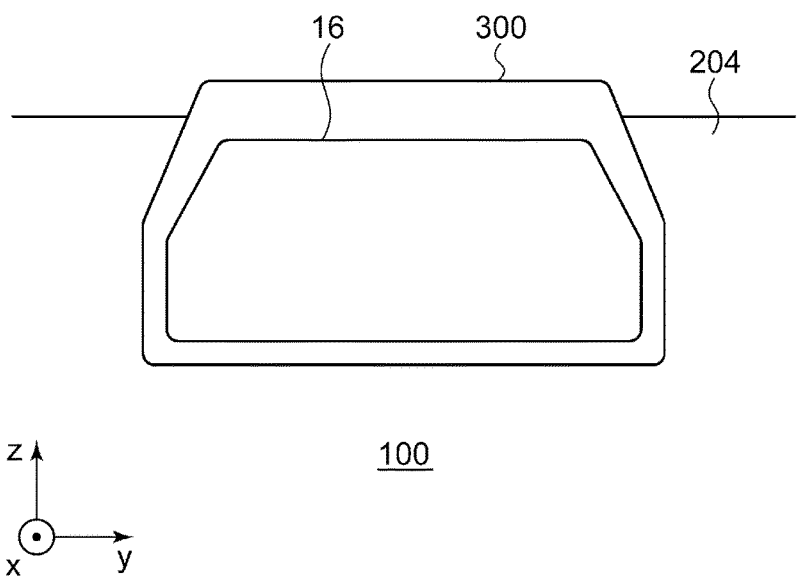
FIG. 4 is a front view showing the first display mode in the vehicle display device of FIG. 3.

The first display panel 16 is built by using a Liquid Crystal Display (LCD). For example, a Thin Film Transistor (TFT) crystal is used. The first display panel 16 has the function of an instrument panel and displays information used for vehicle traveling. Hereinafter, the mode of using the first display panel 16 to display an instrument panel will be referred to as a "first display mode." FIG. 4 is a front view showing the first display mode in the vehicle display device 100. The figure represents an enlarged view of the neighborhood of the vehicle display device 100 of FIG. 1. The first display panel 16 is located so as to be visible to the user at the driver's seat. The circumference of the first display panel 16 is fixed to a frame unit 300.

Figure 5:
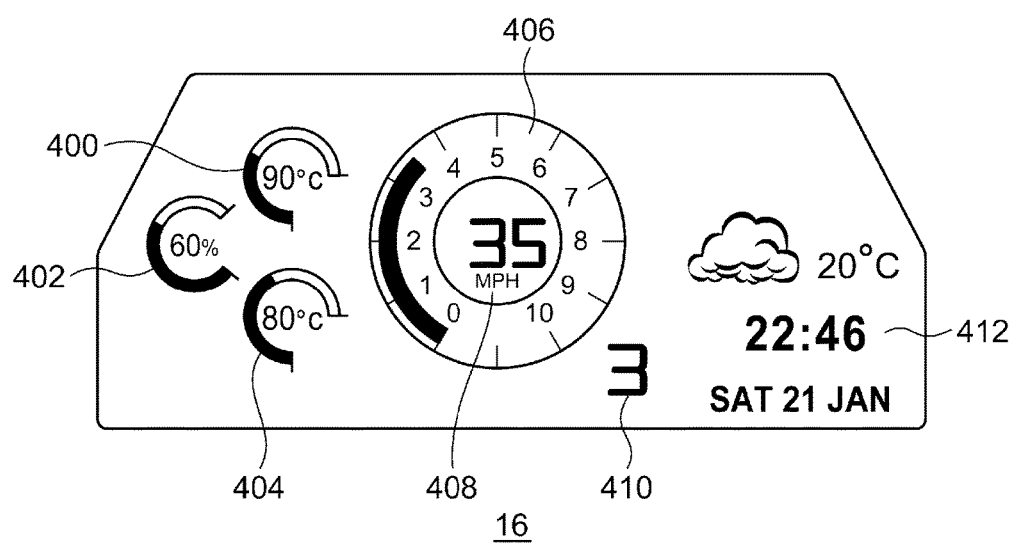
FIG. 5 shows an example of a screen displayed on the first display panel of FIG. 4.

FIG. 5 shows an example of a screen displayed on the first display panel 16. A circular revolution display part 406 is located at the center of the first display panel 16. A speed display part 408 is located at the center of the circle of the revolution display part 406. To the left of the revolution display part 406 are located an oil temperature display part 400, a fuel display part 402, and a water temperature display part 404. Further, a shift position display part 410 and other information display part 412 are located to the right of the revolution display part 406. For example, a clock and a temperature meter are presented in the other information display part 412. The content displayed in the respective parts is publicly known in the art so that a description thereof is omitted. Reference is made back to FIG. 3.

The display control unit 28 generates a content that should be displayed on the first display panel 16, i.e., an image (hereinafter, "a first display mode image") showing the oil temperature display part 400 through the other information display part 412, and displays the first display mode image thus generated on the first display panel 16. The first display mode image is displayed when the first display panel 16 is exposed during normal driving. The first display mode image generated in the display control unit 28 may include a travel distance, turn-by-turn, a map in the navigation system, and video camera images (images from cameras covering respective orientations, a composite image from cameras, an image from an infrared camera).

Like the first display panel 16, the second display panel 18 is built by using a display element such as an LCD. For example, a TFT crystal is used. The second display panel 18 has the function of an instrument panel and displays information used for vehicle traveling. The display surface of the second display panel 18 faces the user when the first display panel 16 is stored in the dashboard 204 of the vehicle. On the other hand, the display surface of the second display panel 18 does not face the user when the first display panel 16 is not stored in the dashboard 204 of the vehicle. In other words, the second display panel 18 and the first display panel 16 are located at mutually different orientations such that only one of them faces the user.

Hereinafter, the mode of using the second display panel 18 to display an instrument panel will be referred to as "a second display mode." The second display mode is a display mode that is simpler than the first display mode and does not require time for visual inspection or enables visual inspection of the information without requiring the driver to gaze. Details will be discussed below.

Figure 6:
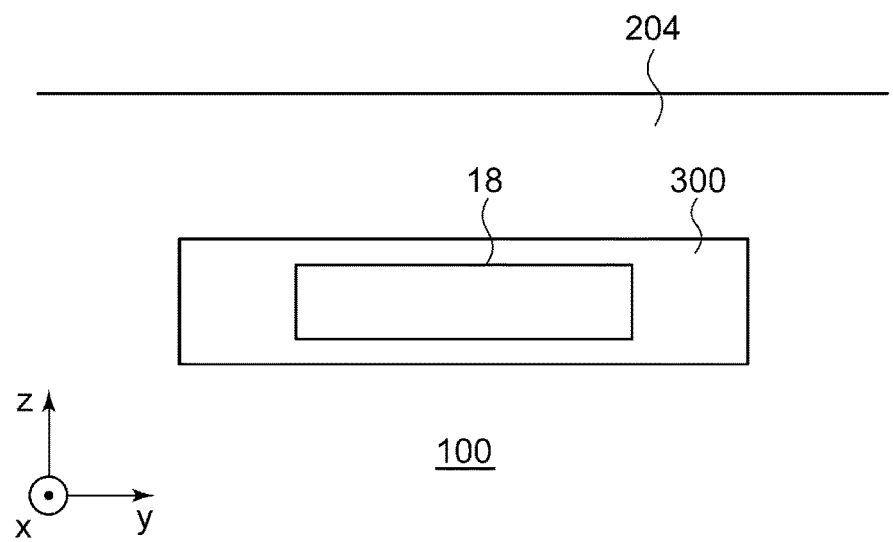
FIG. 6 is a front view showing the second display mode in the vehicle display device of FIG. 3.

FIG. 6 is a front view showing the second display mode in the vehicle display device 100. The figure represents an enlarged view of the neighborhood of the vehicle display device 100 of FIG. 2. The second display panel 18 is located so that the user at the driver's seat is visible. The circumference of the second display panel 18 is fixed to the frame unit 300. The display area of the second display panel 18 is smaller than the display area of the first display panel 16.

Figure 7:
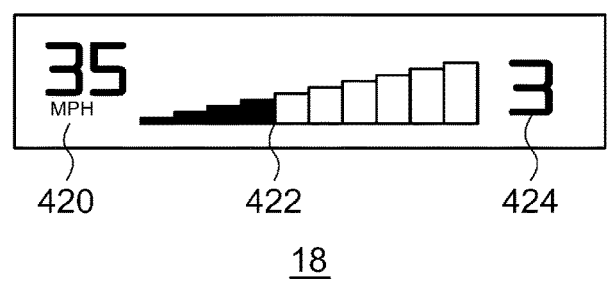
FIG. 7 shows an example of a screen displayed on the second display panel of FIG. 6.

FIG. 7 shows an example of a screen displayed on the second display panel 18. A revolution display part 422 is located at the center of the second display panel 18. A speed display part 420 is located to the left of the revolution display part 422. A shift position display part 424 is located to the right of the revolution display part 422. The content displayed in the respective parts is publicly known in the art so that a description thereof is omitted. Reference is made back to FIG. 3.

The display control unit 28 generates a content that should be displayed on the second display panel 18, i.e., an image (hereinafter, referred to as "a second display mode image") showing the speed display part 420 through the shift position display part 424 and displays the second display mode image thus generated on the second display panel 18. As mentioned above, the display area of the second display panel 18 is smaller than the display area of the first display panel 16. Therefore, the volume of information shown in the second display mode image is smaller than the volume of information shown in the first display mode image. The second display mode image is displayed while the vehicle is not in a normal driving mode and while the second display panel 18 is exposed. The second display mode image generated in the display control unit 28 may include a shift change indicator. At least the traveling speed of the vehicle should be included.

The information acquisition unit 36 acquires information on the traveling vehicle in which the vehicle display device 100 is installed. Further, the information acquisition unit 36 outputs the information on the traveling vehicle to the determination unit 38. The information on the traveling vehicle includes a plurality of types of information. Details will be described below. The GPS reception unit 30 identifies the current position of the vehicle by receiving a signal from a GPS. For example, the current position is indicated by a latitude and a longitude. For identification of the current position, a publicly known technology may be used so that a description thereof is omitted. The GPS reception unit 30 outputs information on the current position to the current position acquisition control unit 44. The current position acquisition control unit 44 receives the information on the current position from the GPS reception unit 30. The current position acquisition control unit 44 outputs the information on the current position to the determination unit 38.

The navigation data 32 stores map data in advance. Road information is attached to the map data. An example of the road information is information related to the width of roads. Facility information is attached to the map data. An example of the facility information is information on parking lots and positional information related to parking lot areas. Another example of the facility information is information related to shopping streets and positional information related to shopping street areas. The navigation information acquisition control unit 42 acquires road information corresponding to the current position from the navigation data 32 based on the current position acquired by the current position acquisition control unit 44. The navigation information acquisition control unit 42 outputs the road information corresponding to the current position to the determination unit 38. The navigation information acquisition control unit 42 also acquires the facility information from the navigation data 32 based on the current position acquired by the current position acquisition control unit 44. The navigation information acquisition control unit 42 outputs the facility information corresponding to the current position to the determination unit 38.

The determination unit 38 receives the information on the traveling vehicle from the information acquisition unit 36 and determines whether it is necessary to make a judgment on the condition in the neighborhood of the vehicle. Three examples related to the determination in the determination unit 38 will be described.

(1) The determination unit 38 determines whether the vehicle is traveling in a parking lot based on the information on the traveling vehicle. More specifically, a determination is made as to whether the vehicle is traveling in a parking lot by referring to the current position information provided by the GPS and the facility information based on the current position information. A determination as to whether the vehicle is traveling in a parking lot is made not only in an outdoor flat parking lot where GPS reception is possible but also in a multilevel parking lot, an indoor parking lot, or an underground parking lot by referring to the acceleration of the vehicle, information on the traveling vehicle, or indoor radio waves as an alternative to GPS. A determination that the vehicle is traveling in a parking lot may be made when the vehicle enters a parking lot or at a predetermined distance (e.g., 10 m) away from a parking lot about to be entered. If the vehicle is not traveling in a parking lot, the determination unit 38 determines that the vehicle is in the "first condition." On the other hand, the determination unit 38 determines that the vehicle is in a "second condition" if the vehicle is traveling in a parking lot. The second condition can be said to be a condition that requires a judgment on a condition in the neighborhood the vehicle.

(2) The determination unit 38 determines whether the vehicle is traveling on a road of less than a predetermined width by referring on the information on the traveling vehicle. For example, the predetermined with is 8 m. The determination unit 38 determines that the vehicle is in the "first condition" if the vehicle is not traveling on a road of less than the predetermined width. On the other hand, the determination unit 38 determines that the vehicle is in the "second condition" if the vehicle is traveling on a road of less than the predetermined width. The second condition here can also be said to be a condition that requires a judgment on the condition in the neighborhood of the vehicle.

(3) The determination unit 38 determines whether the vehicle is traveling on a shopping street by referring to the information on the traveling vehicle. In addition to traveling on a shopping street, the condition may require that the width is less than 8 m. If the vehicle is not traveling on a shopping street, the determination unit 38 determines that the vehicle is in the "first condition." On the other hand, the determination unit 38 determines that the vehicle is in the "second condition" if the vehicle is traveling on a shopping street. The second condition here can also be said to be a condition that requires a judgment on a condition in the neighborhood the vehicle.

The drive control unit 24 receives a result of determination by the determination unit 38. The drive control unit 24 controls the operation of the drive unit 26 in accordance with the result of determination. To describe it more specifically, the drive control unit 24 controls the drive unit 26 to implement the first display mode if the result of determination indicates the "first condition." In other words, the drive control unit 24 orients the first display panel 16 toward the user and does not not orient the second display panel 18 toward the user in order to use the first display panel 16. Meanwhile, the drive control unit 24 controls the drive unit 26 to implement the second display mode if the result of determination indicates the "second condition." In other words, the drive control unit 24 orients the second display panel 18 toward the user and does not orient the first display panel 16 toward the user in order to use the second display panel 18. Thus, the drive control unit 24 switches from the first display mode to the second display mode if the result of determination changes from the "first condition" to the "second condition," and switches from the second display mode to the first display mode if the result of determination changes from the "second condition" to the "first condition."

Figure 8A:
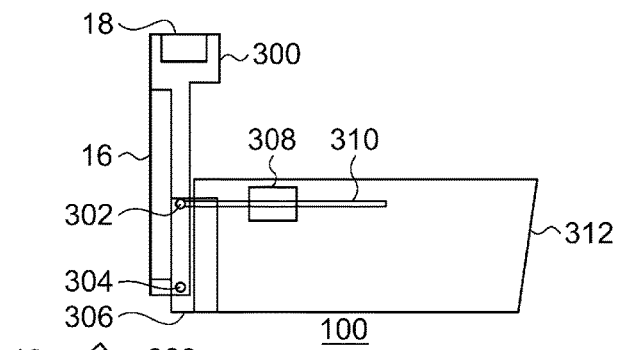
FIGS. 8A-8G are side views showing conditions that occur while the display mode is changed by the vehicle display device of FIG. 3.
Figure 8B:
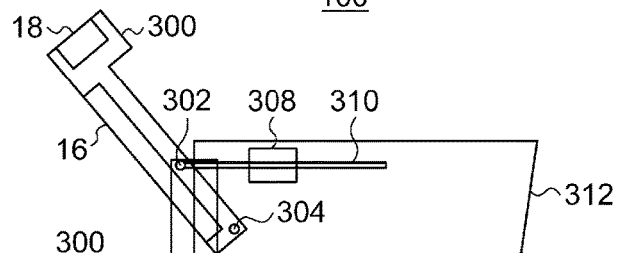
Figure 8C:
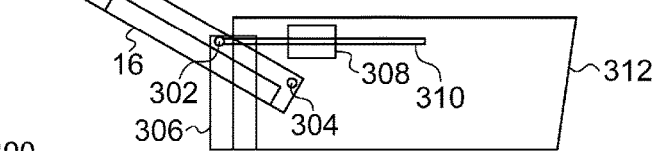
Figure 8D:
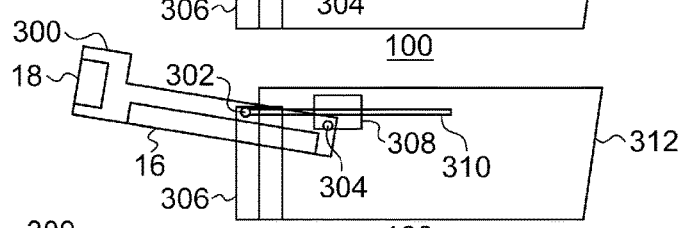
Figure 8E:
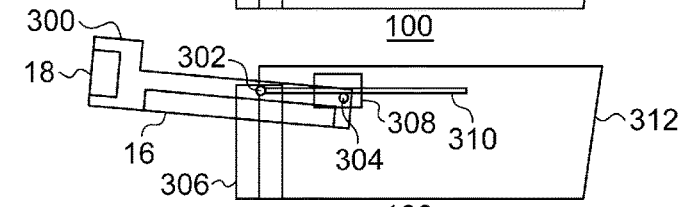

The drive unit 26 is connected to the drive control unit 24 and receives an instruction from the drive control unit 24. The drive unit 26 changes between the first display mode and the second display mode in accordance with the received instruction. The arrangement of the first display panel 16 and the second display panel 18 and the mechanism of switching between the first display mode and the second display mode may be designed as desired. FIGS. 8A-8G will be used to describe the operation of the drive unit 26. FIGS. 8A-8G are side views showing conditions that occur while the display mode is changed by the vehicle display device 100. FIG. 8A is a side view of the vehicle display device 100 in the first display mode. The vehicle display device 100 includes the frame unit 300, a first shaft 302, a second shaft 304, a rotary drive unit 306, a slide drive unit 308, a slide shaft 310, and a display panel storage 312. Further, the first display panel 16 and the second display panel 18 are fitted to the frame unit 300. The rotary drive unit 306 and the slide drive unit 308 correspond to the drive unit 26.

The display panel storage 312 is located on the negative side along the x axis, i.e., on the rear side. The slide drive unit 308 is fixed on the positive side of the display panel storage 312 along the z axis, i.e., toward the top of the display panel storage 312. The slide drive unit 308 supports the slide shaft 310 with a bar shape extending in the x axis direction. The slide drive unit 308 is provided with a motor and a pinion gear of the motor (not shown) and with a rack gear (not shown) provided to be parallel with the slide shaft 310. As the motor of the slide drive unit 308 is rotated to exert a rotational force on the pinion gear, the rack gear is moved in the x axis direction. Therefore, the slide shaft 310 is driven by the slide drive unit 308 to slide in the x axis direction.

The frame unit 300 is rotatably fitted to the end of the slide shaft 310 in the positive direction of the x axis via the first shaft 302. The first shaft 302 extends in the y axis direction and is supported by the rotary drive unit 306. The rotary drive unit 306 is provided with a motor (not shown) and rotates the frame unit 300 around the first shaft 302, using a motor and gear mechanism. The first display panel 16 and the second display panel 18 are located on different surfaces of the frame unit 300. Referring to FIG. 8A, the first display panel 16 is located on the front side of the frame unit 300, and the second display panel 18 is located on the upper surface of the frame unit 300. Therefore, at least a portion of the first display panel 16 is interposed between the user and the field of view in front of the vehicle in the first display mode. The second display panel 18 is interposed between the user and the dashboard 204 of the vehicle in the first display mode. The end of the frame unit 300 opposite to the end on which the second display panel 18 is located is provided with the second shaft 304. The second shaft 304 is engaged with a groove of slide member and is moved accordingly. The groove is provided along the motion trajectory of the second shaft 304.

Figure 8F:
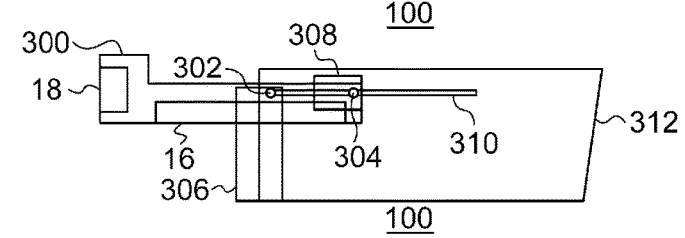
Figure 8G:
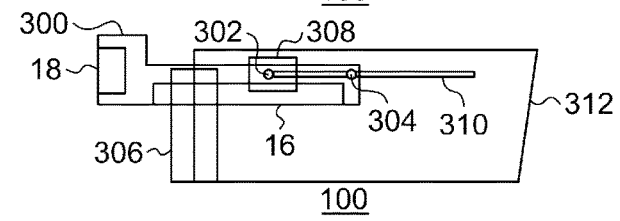

Referring to FIGS. 8B through 8F, the frame unit 300 is rotated around the first shaft 302 by being driven by the rotary drive unit 306. In this process, the slide drive unit 308 may not drive the frame unit 300 or drive the frame unit 300 so as to move in the negative direction of the x axis gradually. The rotation of the frame unit 300 started in FIG. 8A results in the state of FIG. 8F when completed. Referring to FIG. 8F, the frame unit 300 is located such that the second display panel 18 faces forward and the first display panel 16 faces downward. Referring to FIGS. 8F through 8G, the rotary drive unit 306 does not drive the frame unit 300, and the slide drive unit 308 drives the slide shaft 310 so as to move in the negative direction of the x axis. Further, the frame unit 300 is also moved in the negative direction of the x axis along with the movement of the slide shaft 310 and enters the display panel storage 312. FIG. 8G is a side view of the vehicle display device 100 in the second display mode. Thus, the vehicle display device 100 is operated to switch from the first display mode to the second display mode, following the steps of FIGS. 8A through 8G in the stated order. Meanwhile, the vehicle display device 100 is operated to switch from the second display mode to the first display mode, following the steps of FIGS. 8G through 8A in the stated order.

The features are implemented in hardware such as a CPU, a memory, or other LSI's of an arbitrary computer, and in software such as a program loaded into a memory, etc. The figure depicts functional blocks implemented by the cooperation of these elements. Therefore, it will be obvious to those skilled in the art that the functional blocks may be implemented in a variety of manners by hardware only, by software only, or by a combination of hardware and software.

Figure 9:
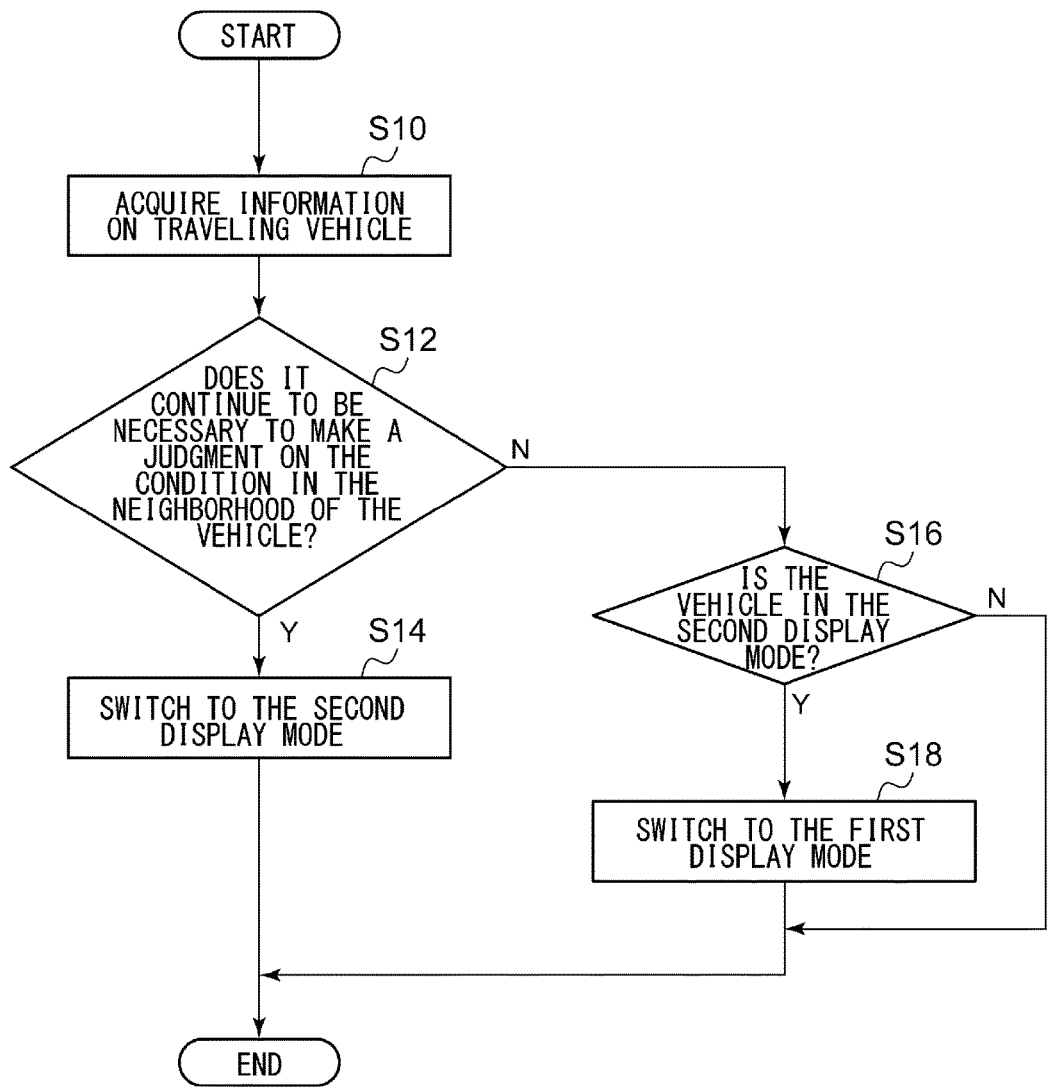
FIG. 9 is a flowchart showing the steps switching the display mode in the vehicle display device of FIG. 3.

A description will be given of the operation of the vehicle display device 100 with the above features. FIG. 9 is a flowchart showing the steps of switching the display mode in the vehicle display device 100. The information acquisition unit 36 acquires the information on the traveling vehicle (S10). If it continues to be necessary to make a judgment on the condition in the neighborhood of the vehicle (Y in S12), the switching unit 10 switches to the second display mode (S14). If it not necessary to continue to make a judgment on the condition in the neighborhood of the vehicle (N in S12) and if the vehicle is in the second display mode (Y in S16), the switching unit 10 switches to the first display mode (S18). If the vehicle is not in the second display mode (N in S16), step 18 is skipped.

According to this embodiment, the first display mode is switched to the second display mode if it is necessary to make a judgment on the condition in the neighborhood of the vehicle. Therefore, the field of view in front of the vehicle required by the condition of driving is secured. Since the first display panel is used to implement the first display mode and the second display panel is used to implement the second display mode, switching between the two display modes can be performed without fail. Since the display area of the second display panel is configured to be smaller than the display area of the first display panel, two types of display regions that provide different visibility can be implemented. Since the second display panel at least displays the traveling speed of the vehicle, indispensable information can be provided even if the display area is small.

Since the first display mode is switched to the second display mode when the vehicle is traveling in a parking lot, the information can be checked easily even when it is necessary to make a judgment on the condition in the neighborhood of the vehicle. Since the first display mode is switched to the second display mode when the vehicle is traveling on a road of less than a predetermined width, the information can be checked easily even when it is necessary to make a judgment on the condition in the neighborhood of the vehicle. Since the first display mode is switched to the second display mode when the vehicle is traveling on a shopping street, the information can be checked easily even when it is necessary to make a judgment on the condition in the neighborhood of the vehicle.

Embodiment 2

A description will now be given of Embodiment 2. Like Embodiment 1, Embodiment 2 relates to a vehicle display device for displaying information as an instrument panel of a vehicle. In Embodiment 2, as in Embodiment 1, one of the first display panel and the second display panel is oriented toward the user depending on the condition of driving of the vehicle, etc. In Embodiment 1, two display panels with different display areas are provided to implement the first display mode and the second display mode. Meanwhile, only one display panel is provided in Embodiment 2. By changing the exposed area, the first display mode and the second display mode are implemented. For this reason, the first display mode in Embodiment 2 is a mode characterized by a larger display area and the second display mode is a mode characterized by a smaller display area. The description here concerns a difference from Embodiment 1.

Figure 10A:
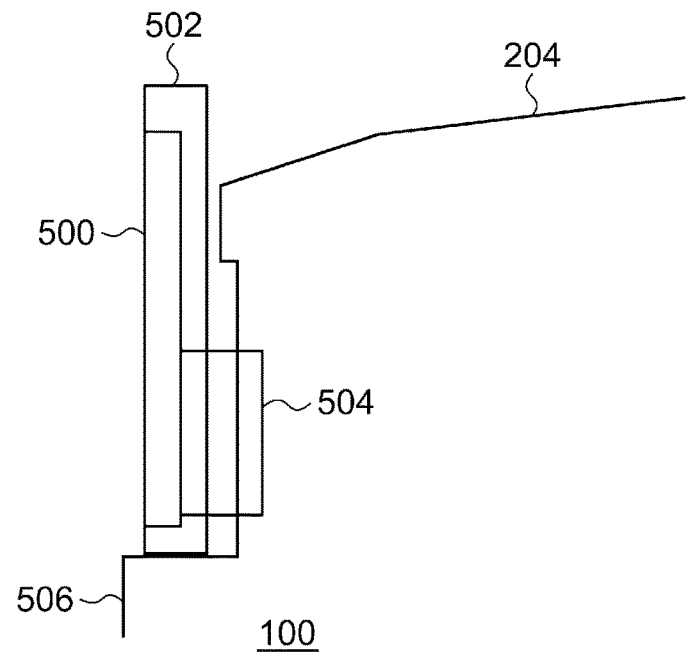
FIGS. 10A-10B are side views showing features of the vehicle display device according to Embodiment 2.
Figure 10B:
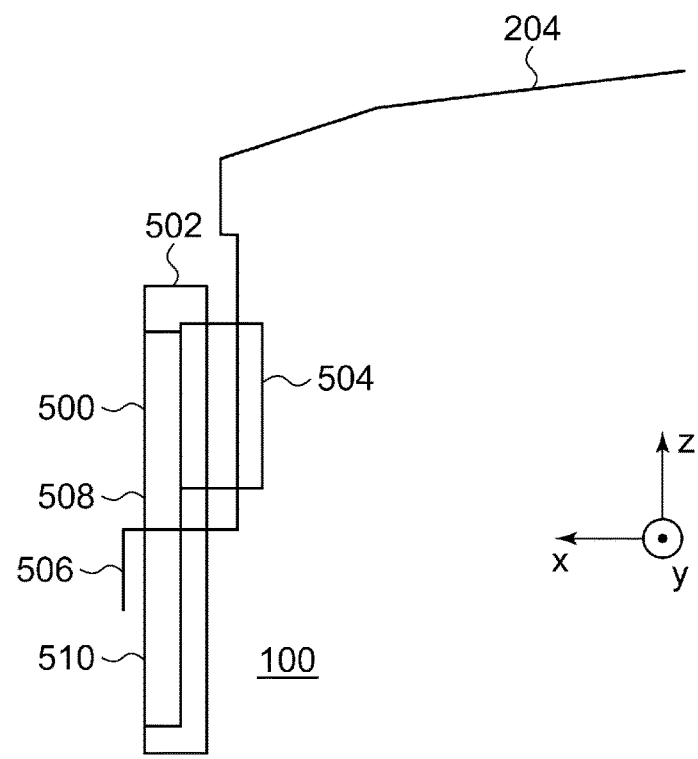
Figure 11A:
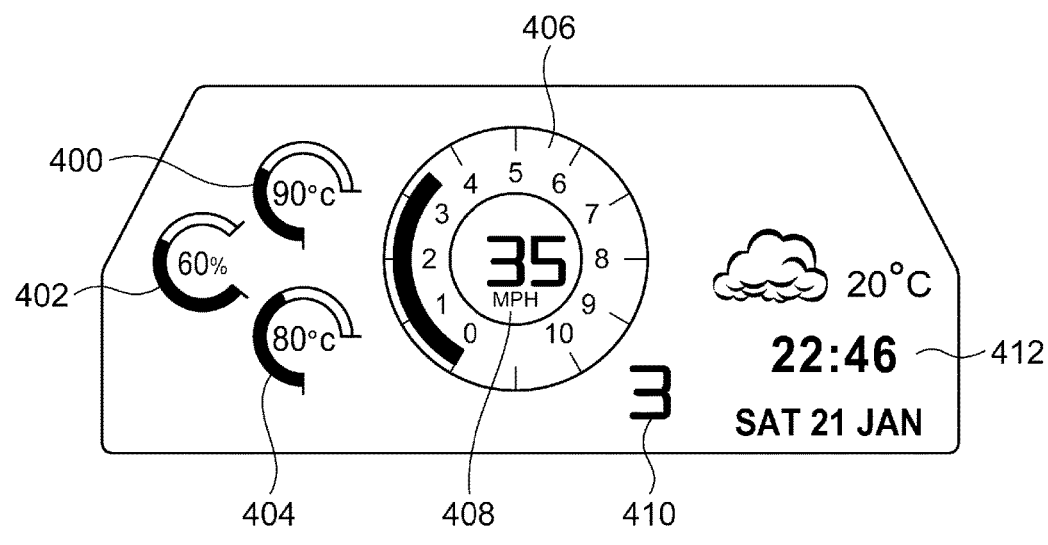
FIGS. 11A-11B show screens displayed on the display panel of FIGS. 10A-10B.
Figure 11B:
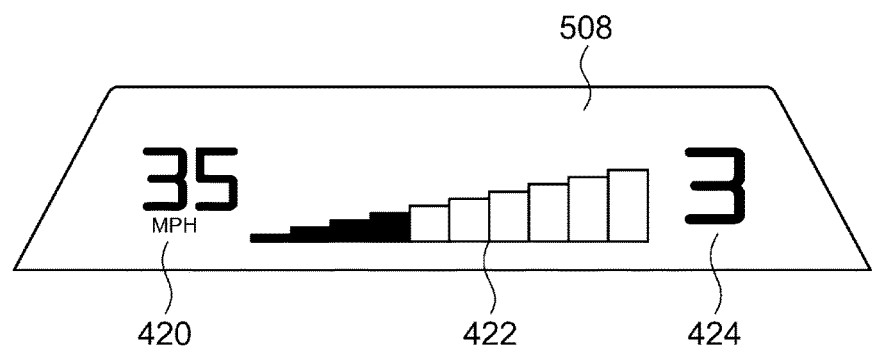

FIGS. 10A-10B are side views showing features of the vehicle display device 100 according to Embodiment 2. FIG. 10A is a side view of the vehicle display device 100 in the first display mode. The vehicle display device 100 includes a display panel 500, a frame unit 502, a slide drive unit 504, and a cover unit 506. The display panel 500 is fitted to the frame unit 502. The display panel 500 corresponds to the first display panel 16 and the second display panel 18 described above. In FIG. 10a, in particular, the display panel 500 corresponds to the first display panel 16. The display panel 500 is an LCD, etc. and is built by using a TFT crystal. The display panel 500 has the function of an instrument panel and displays information used for vehicle traveling. FIGS. 11A-11B show screens displayed on the display panel 500. FIG. 11A shows a screen in the first display mode and corresponds to the first display mode image described above. The screen is similarly shown in FIG. 5. FIG. 11B will be described later and reference is made back to FIG. 10A.

The slide drive unit 504 corresponds to the drive unit 26 described above. The slide drive unit 504 is fixed to the face of the dashboard 204 and supports the frame unit 502. The slide drive unit 504 is provided with a motor and a pinion gear of the motor (not shown), and the side of the frame unit 502 is provided with a rack gear extending in the z axis direction. As the motor of the slide drive unit 504 is rotated to exert a rotational force on the pinion gear, the rack gear is moved in the z axis direction. Therefore, the frame unit 502 is driven by the slide drive unit 504 to slide in the z axis direction.

A cover unit 506 is provided on the face the dashboard 204 and on the negative side of the frame unit 502 in the z axis direction. The cover unit 506 may be integrated with the dashboard 204 or configured to be separate from the dashboard 204. A hole in which the frame unit 502 can be inserted is provided toward the top of the cover unit 506.

FIG. 10B is a side view of the vehicle display device 100 in the second display mode. Referring to FIGS. 10A through 10B, the slide drive unit 504 drives the frame unit 502 to move in the negative direction along the z axis. The movement causes a portion of the frame unit 502 on the negative side in the z axis direction to enter the cover unit 506. Referring to FIG. 10B, the exposed portion of the display panel 500 on the positive side along the z axis is indicated as a first display region 508. Further, the portion on the negative side along the z axis stored in the cover unit 506 is indicated as a second display region 510. The first display region 508 corresponds to the second display panel 18. Thus, the drive control unit 24 (not shown) exposed the entirety of the display panel 500 to implement the first display mode and exposes the first display region 508, i.e., a portion of the display panel 500, to implement the second display mode. Thus, the display area of the first display region 508 is smaller than the display area of the display panel 500.

FIG. 11B shows a screen in the second display mode and corresponds to the second display mode image described above. The screen is similarly shown in FIG. 7. As mentioned above, the volume of information shown in the second display mode image is smaller than the volume of information shown in the first display mode image. The second display mode image generated in the display control unit 28 may include a shift change indicator. At least the traveling speed of the vehicle should be included.

According to this embodiment, the display panel is exposed to implement the first display mode and a portion of the display panel is exposed to implement the second display mode. Therefore, the first display mode and the second display mode can be implemented by using a single display panel. Since the first display mode and the second display mode can be implemented with a single display panel, the cost is prevented from increasing. Since the display area of the first display region is configured to be smaller than the display area of the display panel, two types of display regions that provide different visibility can be implemented. Since the first display region at least displays the traveling speed of the vehicle, indispensable information can be provided even if the display area is small.

Embodiment 3

A description will now be given of Embodiment 3. The vehicle display device according to Embodiment 3 orients one of the first and second display panels toward the driver depending on the condition of driving of the vehicle, etc. and displays information on the display panel thus oriented. The following description concerns a difference from the embodiments described above.

Figure 12:
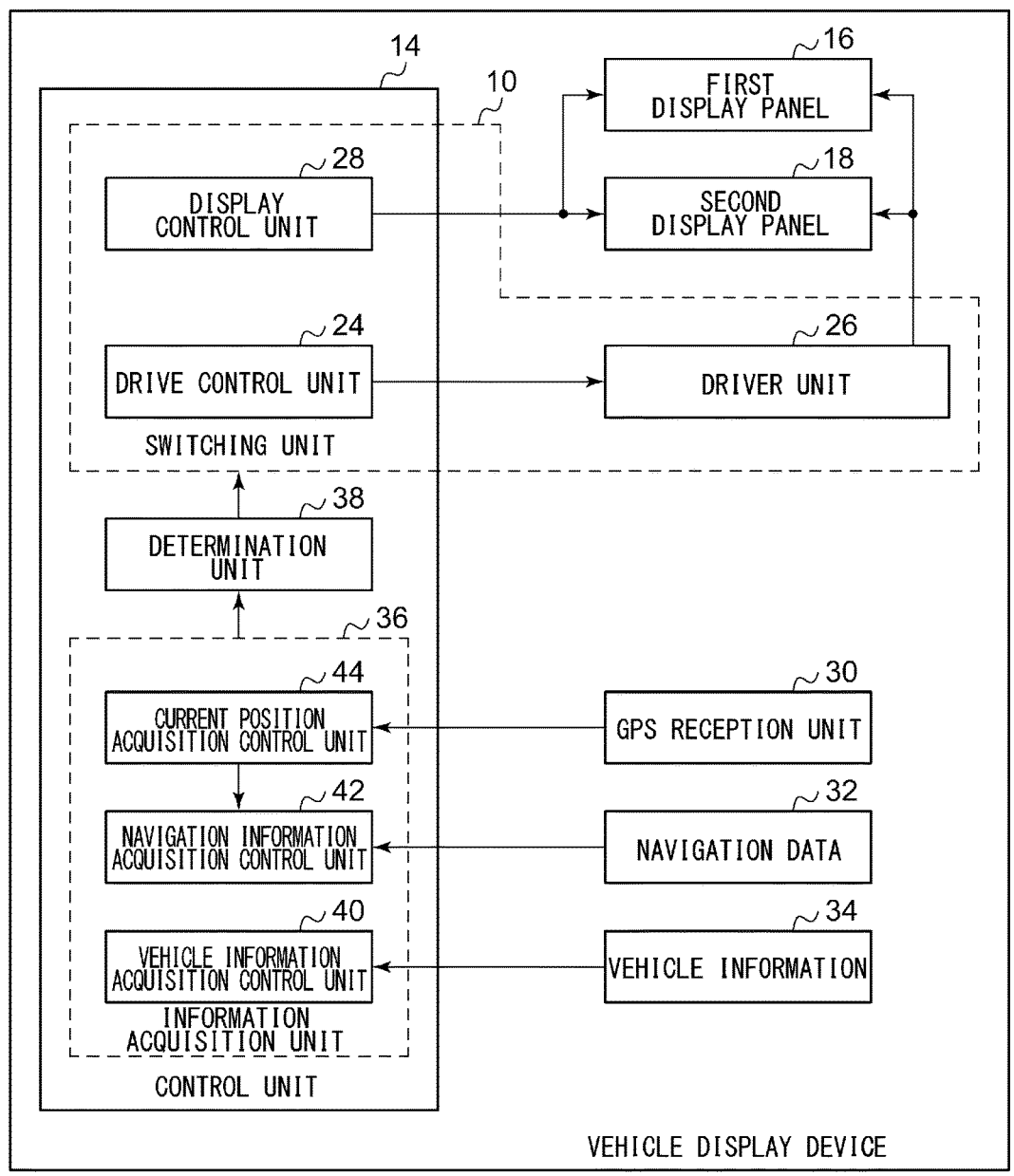
FIG. 12 shows features of the vehicle display device according to Embodiment 3.

FIG. 12 shows features of the vehicle display device 100. The vehicle display device 100 includes the switching unit 10, the first display panel 16, the second display panel 18, the GPS reception unit 30, the navigation data 32, vehicle information 34, the information acquisition unit 36, and the determination unit 38. The switching unit 10 includes the drive control unit 24, the drive unit 26, the display control unit 28. The information acquisition unit 36 includes a vehicle information acquisition control unit 40, the navigation information acquisition control unit 42 and the current position acquisition control unit 44. The control unit 14 includes the drive control unit 24, the display control unit 28, the information acquisition unit 36, and the determination unit 38.

The navigation data 32 stores map data in advance. Road information is attached to the map data. An example of the road information is information related to automobile-only roads that shows divisions on automobile-only roads. Another example of the road information is information related to the shapes of roads that shows positions of corners, intersections, etc. The navigation information acquisition control unit 42 acquires road information corresponding to the current position from the navigation data 32 based on the current position acquired by the current position acquisition control unit 44. The navigation information acquisition control unit 42 outputs the road information corresponding to the current position to the determination unit 38.

The navigation information acquisition control unit 42 also acquires information related to the shape of the road from the navigation data 32 based on the current position acquired by the current position acquisition control unit 44. The navigation information acquisition control unit 42 calculates the number of corners included in the roads on which the vehicle is traveling based on the information related to the shape of the road acquired. For example, the number is derived by integrating the number of corners included in a predetermined distance from the current position. If the number of corners calculated is larger than a threshold value, the navigation information acquisition control unit 42 outputs information indicating that the vehicle is traveling on a road with a large number of corners to the determination unit 38.

The vehicle information 34 stores vehicle operation information on the vehicle in which the vehicle display device 100 is installed. An example of vehicle operation information is information related to whether the vehicle is in a cruise control operation. The vehicle operation information is updated as appropriate. The vehicle information 34 outputs the vehicle operation information to the vehicle information acquisition control unit 40. The vehicle information acquisition control unit 40 receives the vehicle operation information from the vehicle information 34. The vehicle information acquisition control unit 40 outputs information related to whether or not the vehicle is in a cruise control operation to the determination unit 38.

The determination unit 38 receives the information on the traveling vehicle from the information acquisition unit 36 and determines whether the vehicle continues to travel in a condition in which the driver should gaze ahead of the vehicle based on the information on the traveling vehicle. Three examples will be used here to describe the determination in the determination unit 38.

(1) The determination unit 38 determines whether the vehicle is traveling on an automobile-only road based on the information on the traveling vehicle. An automobile-only road is a highway of a higher speed limit that ordinary roads, or a circuit. The determination unit 38 determines that the vehicle is in the "first condition" if the vehicle is not traveling on an automobile-only road. If the vehicle is traveling on an automobile-only road, on the other hand, the determination unit 38 determines that the vehicle is in the "second condition." The second condition can be said to be a traveling condition in which the driver should gaze ahead of the vehicle.

(2) The determination unit 38 determines whether the vehicle is traveling on an automobile-only road and is in a cruise control operation based on the information on the traveling vehicle. The determination unit 38 determines that the vehicle is in the "first condition" if the vehicle is not traveling on an automobile-only road or the vehicle is not in a cruise control operation. Meanwhile, the determination unit 38 determines that the vehicle is in the "second condition" if the vehicle is traveling on an automobile-only road and is in a cruise control operation. It can also be said here that the second condition can be said to be a traveling condition in which the driver should gaze ahead of the vehicle.

(3) The determination unit 38 determines whether the vehicle is traveling on a road with a large number of corners based on the information on the traveling vehicle. The determination unit 38 determines that the vehicle is in the "first condition" if the vehicle is not traveling on a road with a large number of corners. The determination unit 38 determines that the vehicle is in the "second condition" if the vehicle is traveling on a road with a large number of corners. It can also be said here that the second condition can be said to be a traveling condition in which the driver should gaze ahead of the vehicle. A road having a name like " . . . pass" assigned thereto by the navigation information may be identified as a road with a large number of corners. A road where corners occur in succession and corners having less than a predetermined radius of curvature (e.g., less than 80 m) occur in succession may be identified as a road with a large number of corners. A road where corners occur in succession and a large number of accidents occur may be identified as a road with a large number of corners.

Figure 13:
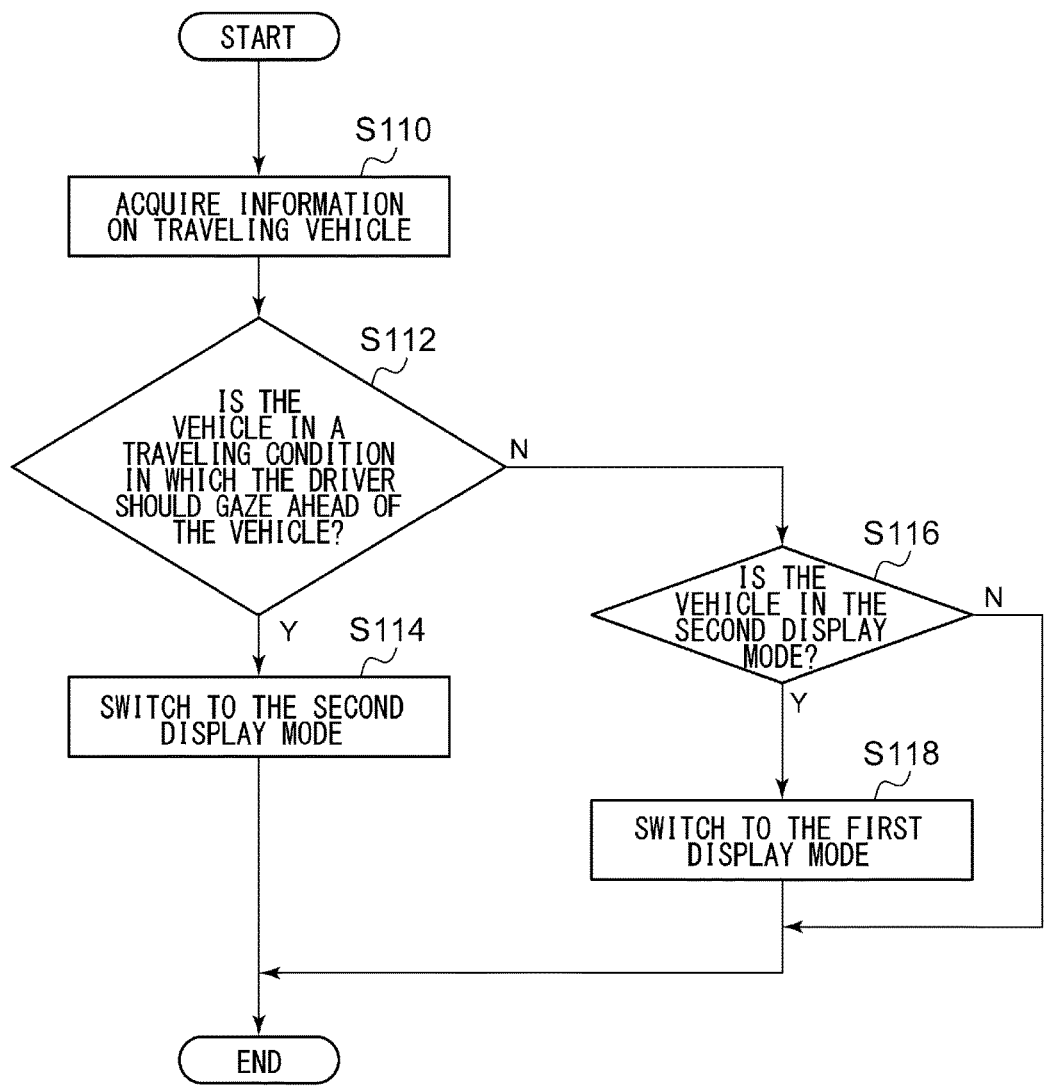
FIG. 13 is a flowchart showing the steps of switching the display mode in the vehicle display device of FIG. 12.

A description will be given of the operation of the vehicle display device 100 with the above features. FIG. 13 is a flowchart showing the steps of switching the display mode in the vehicle display device 100. The information acquisition unit 36 acquires the information on the traveling vehicle (S110). If the vehicle is in a traveling condition in which the driver should gaze ahead of the vehicle (Y in S112), the switching unit 10 switches to the second display mode (S114). If the vehicle is not in a traveling condition in which the driver should gaze ahead of the vehicle (N in S112) and if the vehicle is in the second display mode (Y in S116), the switching unit 10 switches to the first display mode (S118). If the vehicle is not in the second display mode (N in S116), step 18 is skipped.

According to this embodiment, the first display mode is switched to the second display mode if the vehicle continues to travel in a condition in which the driver should gaze ahead of the vehicle. Therefore, information suitable to the condition of driving is presented. Since the first display panel is used to implement the first display mode and the second display panel is used to implement the second display mode, switching between the two display modes can be performed without fail. Since the display area of the second display panel is configured to be smaller than the display area of the first display panel, two types of display regions that provide different visibility can be implemented. Since the second display panel at least displays the traveling speed of the vehicle, indispensable information can be provided even if the display area is small.

Since the first display mode is switched to the second display mode when the vehicle is traveling on an automobile-only road, the information can be checked easily even when the vehicle continues to travel in a condition in which the driver should gaze ahead of the vehicle. Since the first display mode is switched to the second display mode when the vehicle is traveling on an automobile-only road and is in a cruise control operation, the information can be checked easily even when the vehicle continues to travel in a condition in which the driver should gaze ahead of the vehicle. Since the first display mode is switched to the second display mode when the vehicle is traveling on a road with a large number of corners, the information can be checked easily even when the vehicle continues to travel in a condition in which the driver should gaze ahead of the vehicle.

Embodiment 4

A description will be Embodiment 4. Embodiment 4 represents a case where Embodiment 2 is applied to Embodiment 3. Therefore, a description of Embodiment 4 will be omitted here.

Embodiment 5

A description will now be given of Embodiment 5. The vehicle display device according to Embodiment 5 detects whether the vehicle is illuminated by sunlight from behind. If the illumination level is low, the vehicle display device orients the first display panel toward the user and displays information on the first display panel. If the illumination level is high, the vehicle display device orients the second display panel toward the user and displays information on the second display panel. The following description concerns a difference from the embodiments described above.

Figure 14:
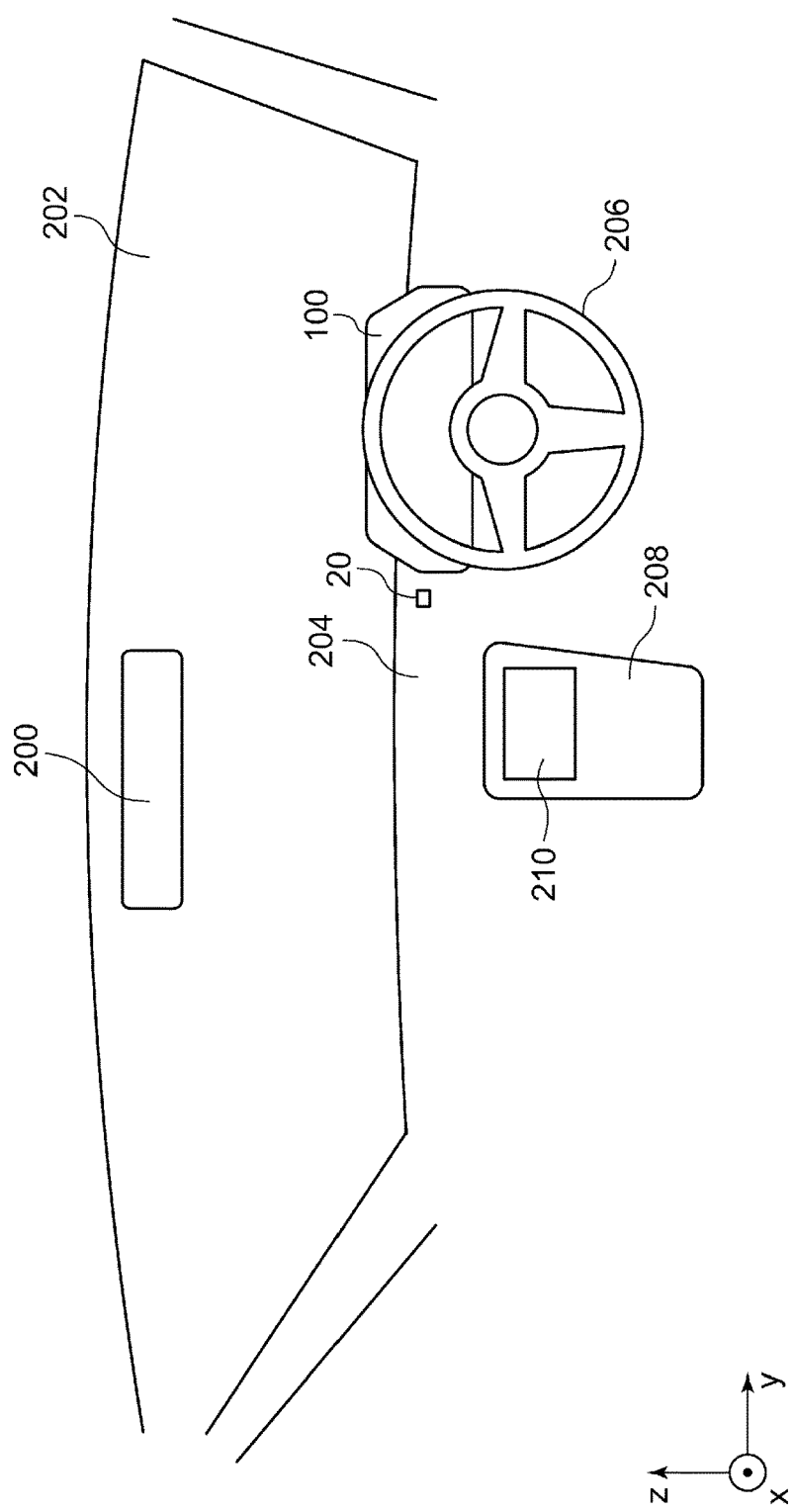
FIG. 14 is a view, from behind, showing the appearance of the interior of the vehicle in which the vehicle display device according to Embodiment 5 is installed.

FIG. 14 is a view, from behind, showing the appearance of the interior of the vehicle in which the vehicle display device 100 of Embodiment 5 is installed. The appearance is similar to that of FIG. 1. A sensor 20 is provided on the negative side of the vehicle display device 100 along the y axis. The sensor 20 may be provided on the positive side of the vehicle display device 100 along the y axis. The sensor 20 is used to detect illumination by sunlight and is connected to the vehicle display device 100 by a signal line (not shown).

Figure 15:
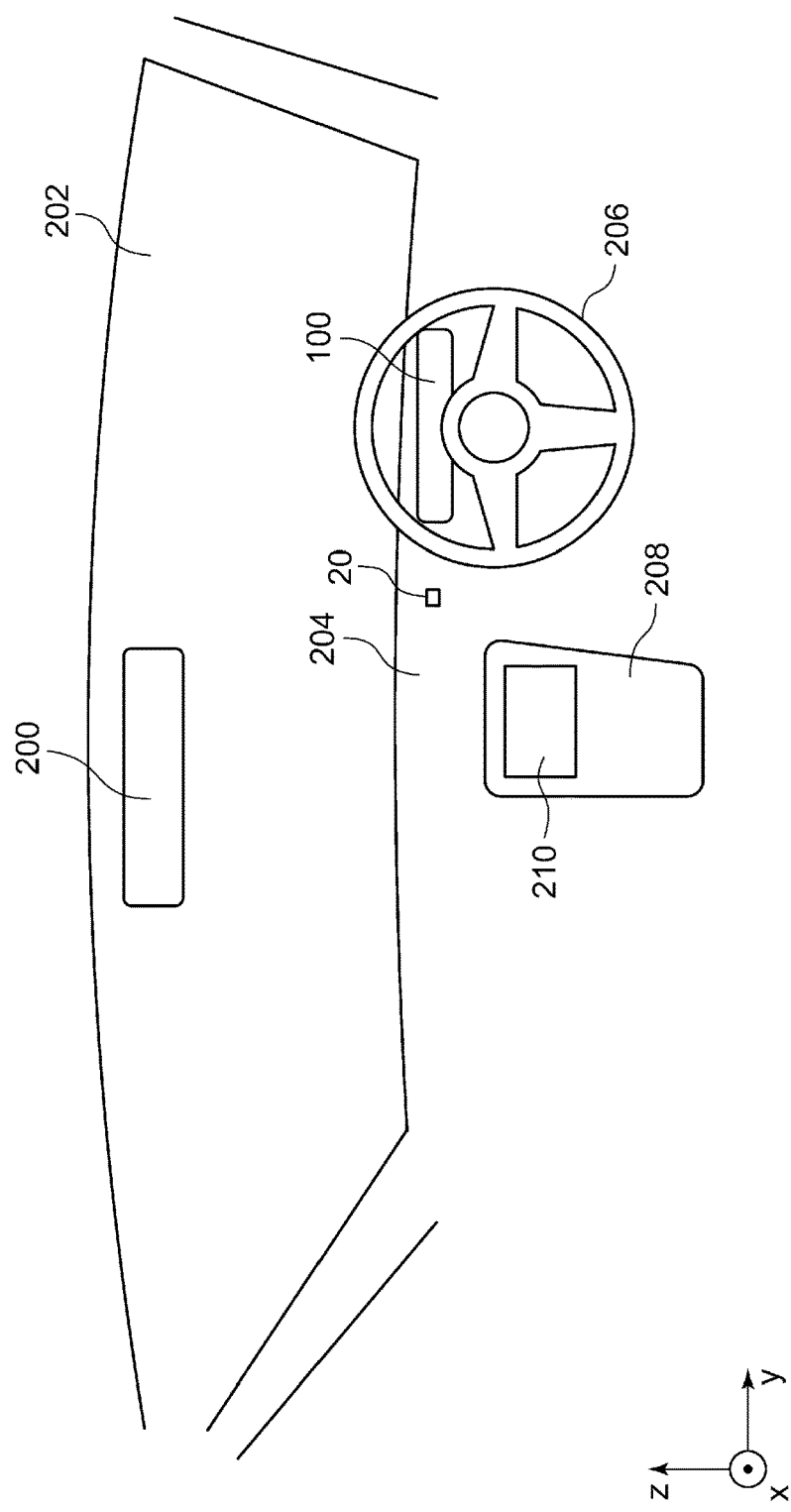
FIG. 15 is an alternative view, from behind, showing the appearance of the interior of the vehicle in which the vehicle display device of FIG. 14 is installed.

FIG. 15 is an alternative view, from behind, showing the appearance of the interior of the vehicle in which the vehicle display device 100 is installed. The figure also shows the sensor 20 provided.

Figure 16:
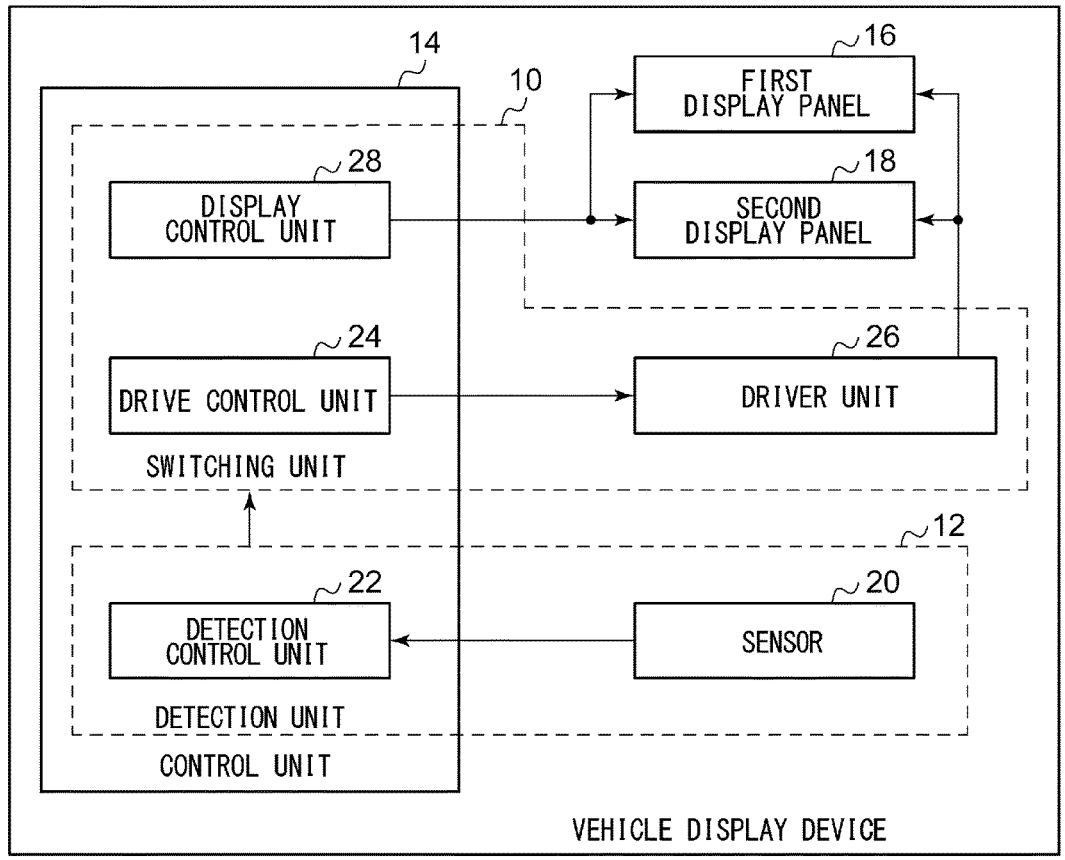
FIG. 16 shows features of the vehicle display device of FIG. 14.

FIG. 16 shows features of the vehicle display device 100. The vehicle display device 100 includes the switching unit 10, a detection unit 12, the first display panel 16, and the second display panel 18. The switching unit 10 includes the drive control unit 24, the drive unit 26, and the display control unit 28. The detection unit 12 includes the sensor 20 and the detection control unit 22. The control unit 14 includes the detection control unit 22, the drive control unit 24, and the display control unit 28.

Figure 17:
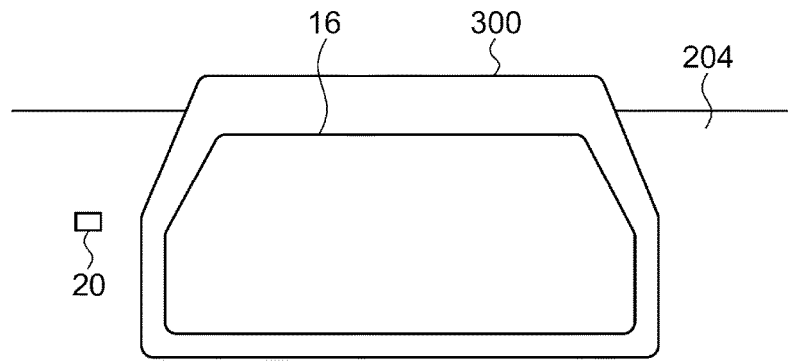
FIG. 17 is a front view showing the first display mode in the vehicle display device of FIG. 16.
Figure 17:
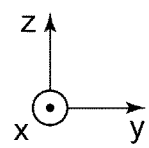
Figure 18:
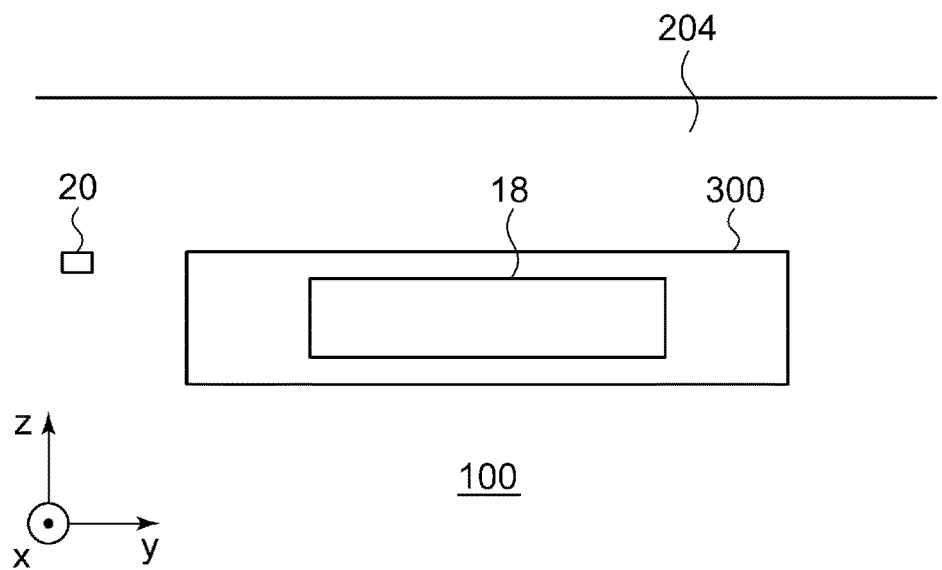
FIG. 18 is a front view showing the second display mode in the vehicle display device of FIG. 16.

FIG. 17 is a front view showing the first display mode in the vehicle display device 100, and FIG. 18 is a front view showing the second display mode in the vehicle display device 100. In addition to the features in FIGS. 4 and 6, the sensor 20 is provided.

The sensor 20 is comprised of a luminance sensor. Alternatively, the sensor 20 may be comprised of a combination of a luminance sensor and a temperature sensor. As shown in FIGS. 14, 15, 17, and 18, the sensor 20 is fixed on the dashboard 204 of the vehicle and is located where it is possible to detect illumination by sunlight from behind, i.e., from the positive side along the x direction. The sensor 20 is connected to the detection control unit 22 via a cable and outputs a result of measurement to the detection control unit 22.

The detection control unit 22 receives the result of measurement from the sensor 20. The detection control unit 22 detects whether the dashboard 204 of the vehicle is illuminated by sunlight based on the result of measurement. For example, if the result of measurement indicates a luminance of 50,000 lux or higher that lasts for 10 sec or longer, the detection control unit 22 detects that the dashboard 204 is illuminated by sunlight. If the condition above is not met, the detection control unit 22 detects that the dashboard is not illuminated by sunlight. In addition to the test described above, the detection control unit 22 may detect that the vehicle is illuminated by sunlight if a temperature rise of 10 degrees or greater is detected within 10 sec. The detection control unit 22 outputs a result of detection to the drive control unit 24.

The drive control unit 24 receives the result of detection from the detection control unit 22. The drive control unit 24 controls the operation of the drive unit 26 in accordance with the result of detection. To describe it more specifically, the drive control unit 24 controls the drive unit 26 to implement the first display mode if the result of detection indicates "not illuminated by sunlight." In other words, the drive control unit 24 orients the first display panel 16 toward the user and does not orient the second display panel 18 toward the user in order to use the first display panel 16. Meanwhile, the drive control unit 24 controls the drive unit 26 to implement the first display mode if the result of determination indicates the "illuminated by sunlight." In other words, the drive control unit 24 orients the second display panel 18 toward the user and does not orients the first display panel 16 toward the user in order to use the second display panel 18. Thus, the drive control unit 24 switches from the first display mode to the second display mode if the result of detection changes from the "not illuminated by sunlight" to the "illuminated by sunlight," and switches from the second display mode to the first display mode if the result of detection changes from the "illuminated by sunlight" to the "not illuminated by sunlight."

Figure 19:
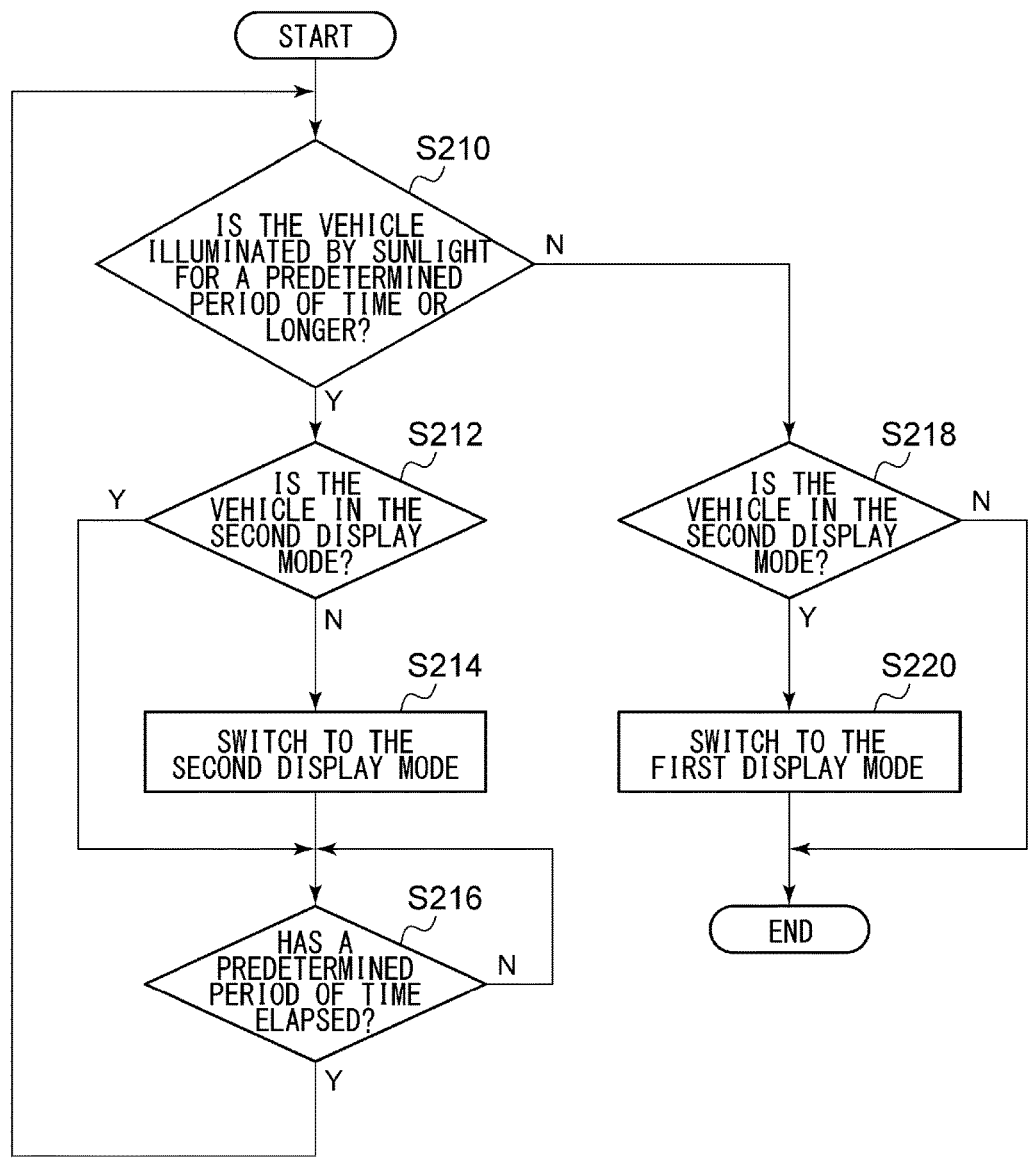
FIG. 19 is a flowchart showing the steps of switching the display mode in the vehicle display device of FIG. 16.

A description will be given of the operation of the vehicle display device 100 with the above features. FIG. 19 is a flowchart showing the steps of switching the display mode in the vehicle display device 100. If the vehicle is illuminated by sunlight for a predetermined period of time or longer (Y in S210) and the vehicle is not in the second display mode (N in S212), the drive control unit 24 switches to the second display mode (S214). If the vehicle is in the second display mode (Y in S212), step 14 is skipped. If a predetermined period of time has not elapsed (N in S216), the system stands by. If the predetermined period of time has elapsed (Y in S216), control is returned to step 10. If the vehicle is not illuminated by sunlight for the predetermined period of time or longer (N in S210) and the vehicle is in the second display mode (Y in S218), the drive control unit 24 switches to the first display mode (S220). If the vehicle is not in the second display mode (N in S218), step 20 is skipped.

The predetermined period of time in step S210 represents a period of time during which the dashboard 204 is continuously illuminated by sunlight while the vehicle is being driven and it is difficult to check the instrument panel visually due to the reflection of sunlight, or a period of time during which the illumination of sunlight could heats the display panel. Specific examples of the predetermined period of time is 1 to 3 minutes.

A step to check whether a change in the direction of travel of the vehicle occurs during a predetermined period of time or longer or in a predetermined distance or longer may be added between step S210 and step S212. For example, the device may further include a navigation information acquisition unit (not shown) so that control may be turned to step S212 if the travel route as scheduled includes travel on a straight road for a predetermined period of time or longer or over a predetermined distance or longer since a point of time when an affirmative determination is made in step S210. A specific example of the predetermined period of time is 1 minute. A specific example of the predetermined distance is 1000 m.

The predetermined period of time in step S216 is a period of time defined to prevent frequent switching between the first display mode and the second display mode due to variation in the condition of illumination by sunlight associated with the movement of the vehicle. A specific example of the predetermined period of time is 5 minutes. The display mode may be switched in step S214 or step S220 on the condition that the vehicle is stopped or the traveling speed of the vehicle is lower than a predetermined speed such as 10 km/h. By adding such a condition, the driver is prevented from being disturbed by the switching of the display mode while driving the vehicle.

According to this embodiment, the device switches to the second display mode characterized by a smaller volume of information displayed than the first display mode when illumination by sunlight is detected so that the visibility is inhibited from being degraded in the presence of illumination by sunlight. Since the device switches to the second display mode characterized by a smaller volume of information displayed than the first display mode when illumination of sunlight is detected, the amount of heat generated is controlled in the presence of illumination by sunlight. When illumination by sunlight is not detected, the device switches to the first display mode characterized by a larger volume of information than the second display mode so that the volume of information provided to the user is increased. The device switches between the first display mode and the second display mode depending on whether the vehicle is illuminated by sunlight or not. Therefore, the device can switch to the display mode so that the device is suited to illumination by sunlight or absence of illumination by sunlight.

Since the sensor 20 is located at a position where it is possible to detect illumination by sunlight from behind the vehicle, the sensor 20 is capable of detecting that the instrument panel is illuminated by sunlight. The sensor 20 may be located at a position suited to the design of the vehicle in which the sensor 20 is used so as to detect illumination from behind the vehicle. For example, the sensor may be provided to detect illumination by sunlight from the rear window, illumination by sunlight from the ceiling, illumination by sunlight from the side of the vehicle, etc. A plurality of sensors 20 may be provided to adapt to the direction of illumination by sunlight.

Since the first display panel is used to implement the first display mode and the second display panel is used to implement the second display mode, switching between the two display modes can be performed without fail. Since the display area of the second display panel is configured to be smaller than the display area of the first display panel, two types of display regions that provide different visibility can be implemented. Since the second display panel at least displays the traveling speed of the vehicle, indispensable information can be provided even if the display area is small. If the display surface of the second display panel 18 is warped in the y axis direction or the z axis direction, visibility in the presence of illumination by sunlight is further improved.

Sixth Embodiment

A description will now be given of Embodiment 6. Embodiment 6 represents a case where Embodiment 2 is applied to Embodiment 5. Therefore, a description of Embodiment 6 will be omitted here.

Seventh Embodiment

A description will now be given of Embodiment 7. Like the foregoing embodiments, Embodiment 7 also relates to a vehicle display device for displaying information as an instrument panel of a vehicle. In the foregoing embodiment, information is displayed in the first display mode if the level of illumination by sunlight from behind the vehicle is low, and information is displayed in the second display mode if the level of illumination is high. Meanwhile, the display panel may not function properly due to heat generation from the display panel or other head sources. In case the display panel is an instrument panel of a vehicle, information such as a traveling speed is displayed. If the information is not displayed properly, vehicle operation will be in trouble or endangered. In Embodiment 7, the display mode is switched to prevent the display panel from reaching a high temperature. The following description concerns a difference from the embodiments described above.

The first display panel 16 and the second display panel 18 of FIG. 16 are configured similarly as above and display information used to drive the vehicle. The backlight of the first display panel 16 and the second display panel 18 will be a heat source of the first display panel 16 and the second display panel 18 in the dashboard 204 along with the sunlight illuminating the dashboard 204. Embodiment 7 is directed to reducing the heat from the backlight of the first display panel 16 and the second display panel 18.

The sensor 20 is a temperature sensor and is located at a position where it is possible to detect the temperature in the dashboard 204 in which the first display panel 16 and the second display panel 18 are provided. For example, the sensor 20 is located in the neighborhood of the first display panel 16 and the second display panel 18 in the dashboard 204. The detection unit 12 receives the result of measurement from the sensor 20. The detection unit 12 detects the temperature of the first display panel 16 and the second display panel 18 based on the result of measurement. The detection control unit 22 outputs the result of measurement, i.e., the temperature, to the drive control unit 24.

The drive control unit 24 receives the result of detection, i.e., the temperature, from the detection control unit 22. The drive control unit 24 controls the operation of the drive unit 26 in accordance with the result of detection. To describe it more specifically, the drive control unit 24 controls the drive unit 26 to implement the first display mode if the temperature is not at a predetermined level or higher. In other words, the drive control unit 24 orients the first display panel 16 toward the user and does not orient the second display panel 18 toward the user in order to use the first display panel 16. Meanwhile, the drive control unit 24 controls the drive unit 26 to implement the second display mode if the temperature is at a predetermined level or higher. In other words, the drive control unit 24 orients the second display panel 18 toward the user and does not orient the first display panel 16 toward the user in order to use the second display panel 18. Thus, the drive control unit 24 switches from the first display mode to the second display mode if the temperature changes from a level below the predetermined level to the predetermined level or higher. Further, the drive control unit 24 switches from the second display mode to the first display mode if the temperature changes from the predetermined level or higher to a level below the predetermined level.

If the temperature is at the predetermined level or higher in the second display mode, the drive control unit 24 lowers the brightness of the backlight of the second display panel 18. This reduces the amount of heat generated. The second display mode is characterized by a smaller volume of information than the first display mode. Only close to minimum requisite information is displayed. The display is less decorative and the number of colors used is smaller. Therefore, visibility is not extremely impaired even if the brightness of the backlight is reduced.

Figure 20:
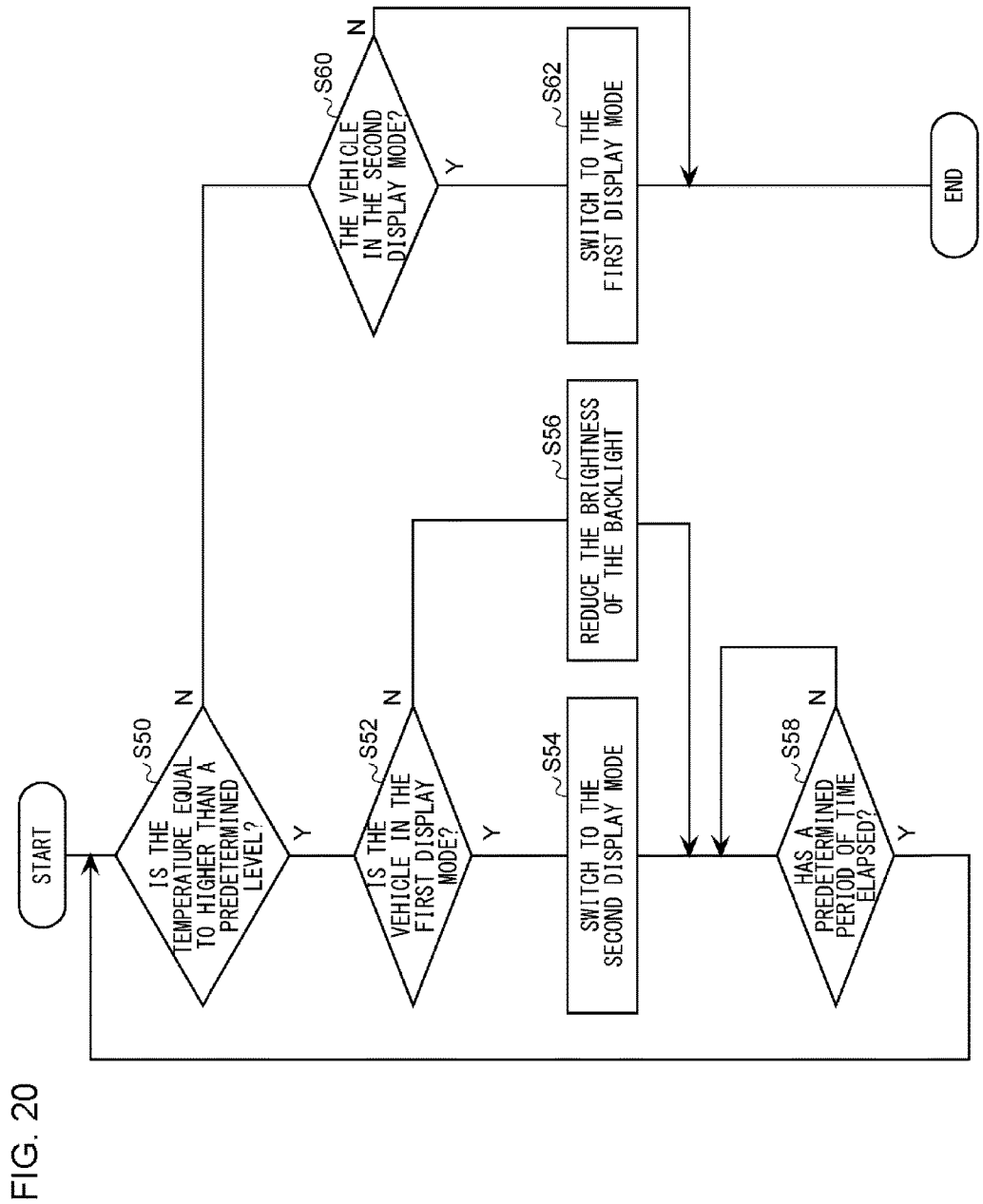
FIG. 20 is a flowchart showing the steps of switching the display mode in the vehicle display device according to Embodiment 7.

A description will be given of the operation of the vehicle display device 100 with the above features. FIG. 20 is a flowchart showing the steps of switching the display mode in the vehicle display device 100 according to Embodiment 7. If the temperature is equal to or higher than a predetermined level (Y in S50) and the vehicle is in the first display mode (Y in S52), the drive control unit 24 switches to the second display mode (S54). If the vehicle is not in the first display mode (N in S52), the brightness of the backlight of the second display panel 18 is reduced (S56). If a predetermined period of time has not elapsed (N in S58), the system stands by. If the predetermined period of time has elapsed (Y in S58), control is returned to step 50. If the temperature is not equal to or higher than a predetermined level (N in S50) and the vehicle is in the second display mode (Y in S60), the drive control unit 24 switches to the first display mode (S62). If the vehicle is not in the second display mode (N in S60), step 62 is skipped.

The predetermined period of time in step S58 is a period of time assumed to be required for the amount of heat generated by the backlight to be reduced and for the temperature in the dashboard 204 to be dropped to a level below a predetermined level by displaying information in the second display mode. Defining the predetermined period of time eliminates the need to perform the process in step S50 frequently and inhibits switching between the first display mode and the second display mode from taking place frequently when the temperature inside the vehicle or the ambient temperature is relatively low. A specific example of the predetermined period of time is 5 minutes.

The display mode may be switched in step S54 or step S60 on the condition that the vehicle is stopped or the traveling speed of the vehicle is lower than a predetermined speed such as 10 km/h. By adding such a condition, the driver is prevented from being disturbed by the switching of the display mode while driving the vehicle.

Since the device switches from the first display mode to the second display mode characterized by a smaller display area when the temperature is equal to or higher than a predetermined level according to this embodiment, the amount of heat generated by the backlight is reduced. Since the amount of heat from the backlight is reduced, indispensable information such as traveling speed can be displayed even if the display area is reduced.

Eighth Embodiment

A description will now be given of Embodiment 8. The vehicle display device according to Embodiment 8 orients one of the first and second display panels toward the driver depending on the condition of driving of the vehicle, etc. and displays information on the display panel thus oriented. Additionally, the vehicle display device lights the display panel not oriented toward the driver if it is necessary to output an alert. By causing the leaked light to be recognized by the driver, the driver is made aware of the alert. The following description concerns a difference from the embodiments described above.

Figure 21:
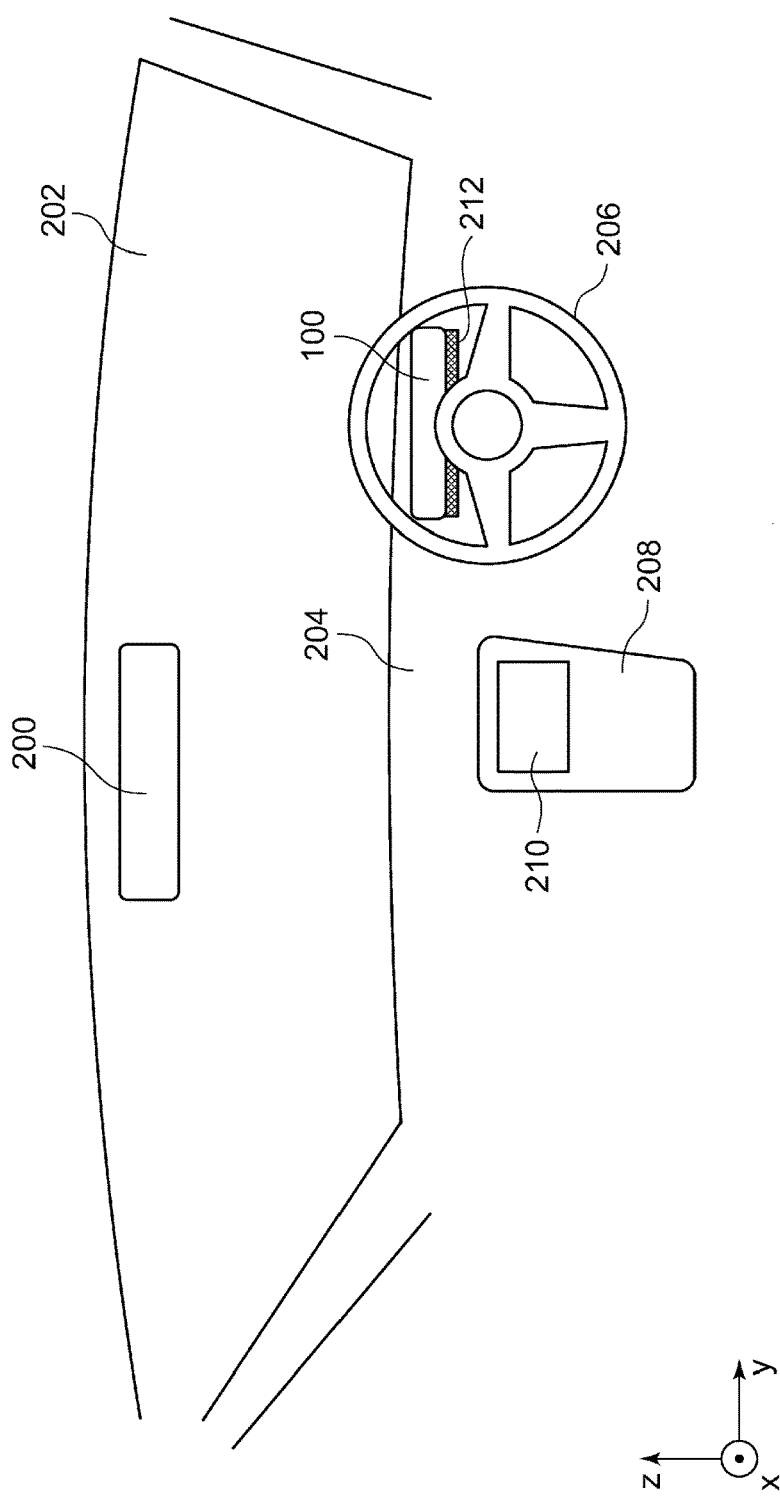
FIG. 21 is an alternative view, from behind, showing the appearance of the interior of the vehicle in which the vehicle display device according to Embodiment 8 is installed.

FIG. 21 is an alternative view, from behind, showing the appearance of the interior of the vehicle in which the vehicle display device 100 is installed. The appearance is similar to that of FIG. 2 except that an alert light 212 is emitted from below the vehicle display device 100.

Figure 22:
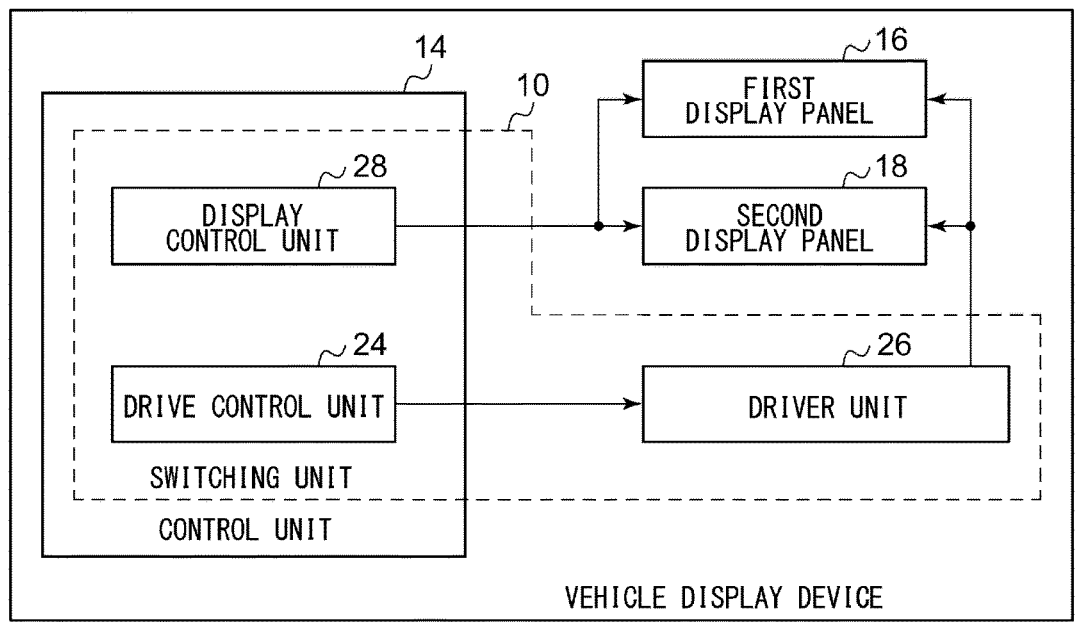
FIG. 22 shows features of the vehicle display device of FIG. 21.

FIG. 22 shows features of the vehicle display device 100. The vehicle display device 100 includes the switching unit 10, the first display panel 16, and the second display panel 18. The switching unit 10 includes the drive control unit 24, the drive unit 26, and the display control unit 28. The control unit 14 includes the drive control unit 24 and the display control unit 28.

Figure 23:
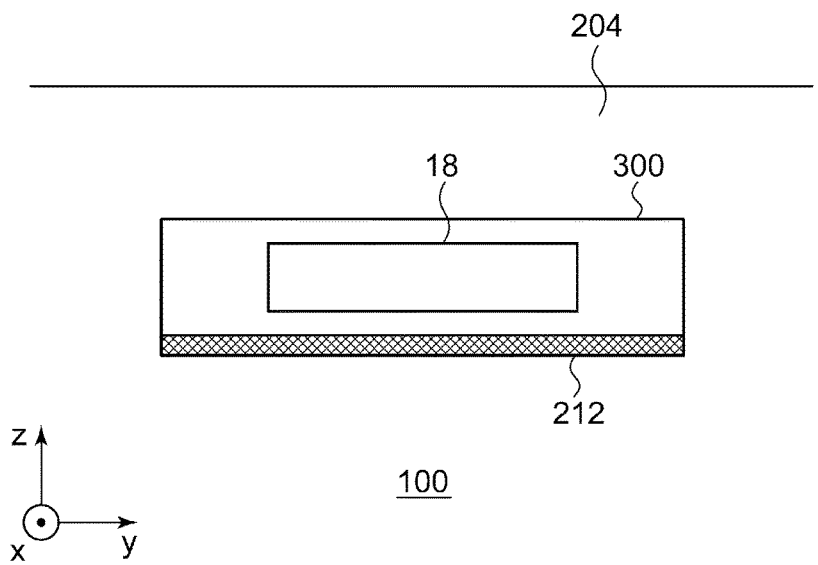
FIG. 23 is a front view showing the second display mode in the vehicle display device of FIG. 22.

FIG. 23 is a front view showing the second display mode in the vehicle display device 100. The view is similar to that of FIG. 6 except that an alert light 212 is emitted from below the frame unit 300. Emission of the alert light 212 will be described below.

Information is presented to the user driving the vehicle by displaying the information on the second display panel 18. In addition to this, the display control unit 28 also presents information by lighting or not lighting the first display panel 16. As shown in FIG. 23, the second display panel 18 is exposed in the second display mode and the first display panel 16 is not exposed. The configuration of the second display panel 18 and the first display panel 16 will be described below. The first display panel 16 in FIG. 23 is stored in the dashboard 204, orienting the display surface in the negative direction along the z axis. In this case, the display content is visible to the user by orienting the second display panel 18 toward the user, while the first display panel 16 is stored in the dashboard 204 and so is located such that the user cannot visually check its display content.

The display control unit 28 receives information that should be included in the second display mode image and also receives alert information, as information that should be presented to the user. The alert information may be any information that should draw the driver's attention. For example, the information alerts the driver that the traveling speed of the vehicle is higher than the speed limit defined for the road being traveled. Alternatively, the alert information may be information to let the driver know that the road is under construction. The alert information like this is acquired by a publicly known technology. The display control unit 28 lights the first display panel 16 when the alert information is received. For example, light of a plain color (e.g., red, blue, etc.) may be emitted. The color may be changed depending on the type of alert information. When the first display panel 16 emits light, the light emitted by the first display panel 16 leaks from, for example, a gap between the frame unit 300 and the dashboard 204 so that the user can notice the light emitted from the first display panel 16, although the first display panel 16 is located such that the display content is not visible to the user.

The alert information may be based on the content displayed in the first display mode but not displayed in the second display mode. According to the example shown in FIGS. 5 and 7, the alert may be related to oil temperature, fuel, or water temperature. By outputting an alert like this, the user can access the information substantially identical to the information in the first display mode even during the second display mode characterized by a smaller volume of information and improved visibility.

In further accordance with this embodiment, the light may be emitted in any of a variety of colors since the alert information is output using a display panel such as a liquid crystal panel. For example, an alert for an increase in the oil temperature may be linked with emission of yellow light, an alert for a reduction in the fuel amount may be linked with emission of red light, and an alert for a water temperature may be linked with emission of blue light. Further, an alert may be output by blinking of light and the interval of blinking may be reduced as the alert level becomes higher.

When an alert light is emitted during the second display mode, the mode may be switched to the first display mode in response to a predetermined user operation. Alternatively, if an alert light is emitted and a user operation to implement the first display mode is not performed for a predetermined period of time, the mode may be automatically switched to the first display mode.

The drive control unit 24 controls the operation of the drive unit 26 to switch the display mode such that one of the first display panel 16 and the second display panel 18 faces the user. To describe it further details, the drive control unit 24 receives information on the engine from the electronic control unit (ECU) for controlling the engine operation. When the engine information indicates that the engine is stopped, the drive control unit 24 implements the second display mode. Meanwhile, if one of the following conditions is met, the drive control unit 24 implements the first display mode. The conditions include: (1) when the door on the driver side is opened; (2) when the user is seated at the driver's seat; (3) when the user is seated at the driver's seat and fastens the seat belt; and (4) when the engine is started. These conditions are detected by a sensor (not shown) and is input to the drive control unit 24. Further, when the traveling speed becomes higher than a threshold value while the first display mode is being implemented, the drive control unit 24 may implement the second display mode. One of the first display mode and the second display mode may be selected by a switch (not shown).

In implementing the first display mode, the drive control unit 24 orients the first display panel 16 toward the user so as to be visible to the user and does not orient the second display panel 18 toward the user in order to use the first display panel 16. Meanwhile, in implementing the second display mode, the drive control unit 24 orients the second display panel 18 toward the user so as to be visible to the user and does not orient the first display panel 16 toward the user in order to use the second display panel 18. Thus, the drive control unit 24 switches from the first display mode to the second display mode or switches from the second display mode to the first display mode, when the display mode should be switched. Regardless of whether the first display mode or the second display mode is implemented, the display panel not oriented toward the user is used as a display panel for presenting information by lighting or not lighting the display panel, if that display panel is positioned or oriented so as not to be visible to the user.

According to this embodiment, the display mode of the display panel is switched and information is presented by lighting or not lighting the display panel as well as by being displayed on the display panel in one of the display modes. Therefore, information suited to the condition of driving can be displayed and an alert can be output. Of the first display panel and the second display panel, the Information is displayed and presented on the display panel oriented toward the user. The information is also presented by lighting or not lighting the other display panel so that different types of information can be communicated properly. In case the information that should be presented to the user is an alert, the first display panel is lighted so that the alert can draw the attention. Since the first display panel is lighted in a plain color, the user can easily recognize the alert.

Since the first display panel is lighted while the first display panel is stored in the dashboard of a vehicle, an alert can be communicated without interfering with the presentation of information on the second panel. Since the first display panel is used to implement the first display mode and the second display panel is used to implement the second display mode, switching between the two display modes can be performed without fail. Since the display area of the second display panel is configured to be smaller than the display area of the first display panel, two kinds of display regions that provide different visibility can be implemented. Since the second display panel at least displays the traveling speed of the vehicle, indispensable information can be provided even if the display area is small.

Ninth Embodiment

A description will now be given of Embodiment 9. Like Embodiment 8, Embodiment 9 relates to a vehicle display device for displaying information as an instrument panel of a vehicle. In Embodiment 9 as well as in the foregoing embodiment, the vehicle display device orients one of the first and second display panels toward the driver depending on the condition of driving of the vehicle, etc. and displays information on the display panel thus oriented. The vehicle display device also lights the display panel not oriented toward the user to output an alert. In Embodiment 8, two display panels with different display areas are provided to implement the first display mode and the second display mode. Meanwhile, only one display panel is provided in Embodiment 9. By changing the exposed area, the first display mode and the second display mode are implemented. For this reason, the first display mode in Embodiment 9 is a mode characterized by a larger display area and the second display mode is a mode characterized by a smaller display area. The following description concerns a difference from the embodiments described above.

The display control unit 28 (not shown) displays information for an instrument panel in the first display region 508 in the second display mode and lights the second display region 510 to present an alert. The light is emitted in a plain color as described above.

According to this embodiment, the display panel is exposed to implement the first display mode and a portion of the display panel is exposed to implement the second display mode. Therefore, the first display mode and the second display mode can be implemented by using a single display panel. Since the first display mode and the second display mode can be implemented with a single display panel, the cost is prevented from increasing. Since the display area of the first display region is configured to be smaller than the display area of the display panel, two types of display regions that provide different visibility can be implemented. Since the first display region at least displays the traveling speed of the vehicle, indispensable information can be provided even if the display area is small. In the second display mode, the second display region 510 is lighted while the information is being displayed in the first display region 508 so that the information can be presented by the display and light emission. In case the information that should be presented to the user is an alert, the second display region 510 is lighted so that the alert can draw the attention. Since the second display region 510 is lighted in a plain color, the user can easily recognize the alert.

Described above is an explanation based on an exemplary embodiment. The embodiment is intended to be illustrative only and it will be understood by those skilled in the art that various modifications to constituting elements and processes could be developed and that such modifications are also within the scope of the present invention.

In Embodiments 1, 3, 5, 7, and 8, the first display panel 16 is oriented forward and the second display panel 18 is oriented upward in the first display mode. In the second display mode, the first display panel 16 is oriented downward and the second display panel 18 is oriented forward. Alternatively, the first display panel 16 may be oriented forward and the second display panel 18 may be oriented downward in the first display mode. In the second display mode, the first display panel may be oriented upward and the second display panel 18 may be oriented forward. According to this variation, the flexibility of the configuration is improved.

In Embodiments 1, 3, 5, 7, and 8, the display surface of the second display panel 18 is flat shaped. Alternatively, the display surface of the second display panel 18 may be shaped to include a curved surface.

According to this variation, the flexibility of the configuration is improved.

The following features may be added to Embodiments 1 through 9.
(1) An illumination sensor is arranged to the left and right of the vehicle display device 100 to automatically control the luminance of the screen in accordance with the ambient brightness.
(2) The luminance of the screen is configured to be manually adjusted to a desired brightness.
(3) A filter for controlling the viewing angle is provided inside or outside the vehicle display device 100 to prevent the screen light from being reflected in the windshield 202 of the vehicle to interfere with the field of view of the driver. This inhibits the screen light from being reflected in the windshield 202.

In the embodiments described above, several exemplary situations that require a judgment on the condition in the neighborhood of the vehicle are discussed. The situations are not limited to those discussed and other similar situations may occur.

Further, the user driving the vehicle tends to lean forward in a situation that requires a judgment on the condition in the neighborhood of the vehicle. For example, a judgment on the condition in the neighborhood of the vehicle may be determined to be necessary when a sensor in the seat detects that a forward load on the seat continues to increase for a predetermined duration or longer. Alternatively, the posture of the driver may be stored and referred to for determination when the vehicle is subsequently driven.

In the embodiments described above, several exemplary traveling conditions in which the driver should gaze ahead of the vehicle are discussed. Other conditions in which the driver should gaze ahead may include roads where a lot of accidents occurred, narrow roads having less than a certain width, and school zones.

The embodiments are useful to closed-body vehicles but are particularly advantageous in open-body vehicles, cabriolet vehicles, vehicles provided with a roof window. In the case of these vehicles, the function discussed in the embodiments may be put into operation when, for example, the roof is opened or the shade of the roof window is opened.

In Embodiment 8, the first display panel 16 not oriented toward the user is lighted to give an alert in the second display mode. Alternatively, the second display panel not oriented toward the user may be lighted to give an alert in the first display mode. According to this variation, an alert can be presented by lighting the display panel even in the first display mode.

What is claimed is:
1. A vehicle display device comprising:
 a display panel that displays information used for vehicle driving;
 an information acquisition unit that acquires a condition of the vehicle; and
 a switching unit that switches from a first display mode of the display panel to a second display mode of the display panel for displaying information of a smaller information volume than an information volume of information displayed in the first display mode by configuring a visible area to be smaller than that of the first display mode, based on the condition of the vehicle acquired in the information acquisition unit,
 wherein the display panel comprises:
  a first display panel, and
  a second display panel that includes a display surface, the display surface being oriented toward a user when the first display panel is stored in a dashboard of the vehicle, and the display surface not being oriented toward the user when the first display panel is not stored in the dashboard of the vehicle, and
 wherein the switching unit uses the first display panel to implement the first display mode and uses the second display panel with a display area smaller than a display area of the first display panel to implement the second display mode.

2. The vehicle display device according to claim 1, wherein
 the information acquisition unit acquires information on the traveling vehicle as a condition of the vehicle, and
 the switching unit switches from the first display mode of the display panel to the second display mode of the display panel for displaying information of a smaller information volume than an information volume of information displayed in the first display mode by configuring the visible area to be smaller than that of the first display mode, when the information on the traveling vehicle acquired in the information acquisition unit indicates that it is necessary to make a judgment on a condition in the neighborhood of the vehicle.

3. The vehicle display device according to claim 2, wherein
 the information acquisition unit acquires a current position of the vehicle and facility information corresponding to the current position, as the information on the traveling vehicle, and
 the switching unit switches from the first display mode to the second display mode when the information on the traveling vehicle acquired in the information acquisition unit indicates that the vehicle is traveling in a parking lot or on a shopping street.

4. The vehicle display device according to claim 2, wherein
 the information acquisition unit acquires a current position of the vehicle and road information corresponding to the current position, as the information on the traveling vehicle, and
 the switching unit switches from the first display mode to the second display mode when the information on the traveling vehicle acquired in the information acquisition unit indicates that the vehicle is traveling on a road of less than a predetermined width.

5. The vehicle display device according to claim 1, wherein
the information acquisition unit acquires information on the traveling vehicle as a condition of the vehicle, and
the switching unit switches from the first display mode of the display panel to the second display mode of the display panel for displaying information of a smaller information volume than an information volume of information displayed in the first display mode by configuring the visible area to be smaller than that of the first display mode, when the information on the traveling vehicle acquired in the information acquisition unit indicates that the vehicle continues to travel in a condition in which a driver should gaze ahead of the vehicle.

6. The vehicle display device according to claim 5, wherein
the information acquisition unit acquires a current position of the vehicle and road information corresponding to the current position, as the information on the traveling vehicle, and
the switching unit switches from the first display mode to the second display mode when the information on the traveling vehicle acquired in the information acquisition unit indicates that the vehicle is traveling on an automobile-only road or a road with a large number of corners.

7. The vehicle display device according to claim 5, wherein
the information acquisition unit acquires information on the traveling vehicle as the information on the traveling vehicle, and
the switching unit switches from the first display mode to the second display mode when the information on the traveling vehicle acquired in the information acquisition unit indicates that the vehicle is traveling on an automobile-only road and is in a cruise control operation.

8. The vehicle display device according to claim 1, wherein
the information acquisition unit is a detection unit that detects whether a dashboard of the vehicle is illuminated by sunlight, and
the switching unit switches from the first display mode of the display panel to the second display mode of the display panel for displaying information of a smaller information volume than an information volume of information displayed in the first display mode by configuring the visible area to be smaller than that of the first display mode, when the detection unit detects illumination by sunlight.

9. The vehicle display device according to claim 8, wherein
the detection unit is located at a position where it is possible to detect illumination by sunlight from behind the vehicle.

10. The vehicle display device according to claim 1, wherein
the information acquisition unit is a detection unit that detects a temperature of the display panel, and
the switching unit switches from the first display mode of the display panel to the second display mode of the display panel for displaying information of a smaller information volume than an information volume of information displayed in the first display mode by configuring the visible area to be smaller than that of the first display mode, when the detection unit detects a temperature of a predetermined level of higher.

11. The vehicle display device according to claim 10, wherein
the detection unit is located at a position where it is possible to detect a temperature in a dashboard of the vehicle in which the display panel is provided.

12. The vehicle display device according to claim 1, wherein
the switching unit exposes the display panel to implement the first display mode and exposes a portion of the display panel such that a display area of the display panel is smaller than in the first display mode, thereby implementing the second display mode.

13. The vehicle display device according to claim 1, wherein at least a traveling speed of the vehicle is displayed in the second display mode.

14. The vehicle display device according to claim 12, wherein at least a traveling speed of the vehicle is displayed in the second display mode.

15. A vehicle display device comprising:
a display panel that displays information used for vehicle driving;
an information acquisition unit that acquires a condition of the vehicle; and
a switching unit that switches from a first display mode of the display panel to a second display mode of the display panel for displaying information of a smaller information volume than an information volume of information displayed in the first display mode by configuring a visible area to be smaller than that of the first display mode, based on the condition of the vehicle acquired in the information acquisition unit,
wherein the switching unit exposes the display panel to implement the first display mode and exposes a portion of the display panel such that a display area of the display panel is smaller than in the first display mode, thereby implementing the second display mode.

16. The vehicle display device according to claim 15, wherein at least a traveling speed of the vehicle is displayed in the second display mode.

* * * * *